(12) United States Patent
King et al.

(10) Patent No.: US 8,748,857 B2
(45) Date of Patent: Jun. 10, 2014

(54) SYSTEM FOR AUTOMATIC ALIGNMENT, STABILIZATION, AND FOCUS FOR AN OFF-AXIS TELESCOPE USING BIASED ANGLE SENSORS

(75) Inventors: William B. King, Rancho Palos Verdes, CA (US); Peter V. Messina, Santa Monica, CA (US); Ronald George Hegg, Vista, CA (US); Chaunchy F. McKearn, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 585 days.

(21) Appl. No.: 12/869,295

(22) Filed: Aug. 26, 2010

(65) Prior Publication Data

US 2012/0049040 A1 Mar. 1, 2012

(51) Int. Cl.
G01V 8/00 (2006.01)
H01J 3/14 (2006.01)
G02B 23/00 (2006.01)

(52) U.S. Cl.
USPC ............... 250/559.1; 250/559.3; 250/216; 359/399

(58) Field of Classification Search
USPC .......... 250/201.1, 201.6, 203.2, 221, 214 R, 250/559.1, 559.29, 216, 234–236, 201.9, 250/201.3, 559.3, 206.1; 359/399, 403, 359/405, 383, 684, 850, 852, 867, 862, 874, 359/876, 872, 623; 348/745; 355/55, 57; 356/609, 3, 3.05, 3.08, 3.03, 3.13, 356/4.01, 4.05, 18, 20, 21, 11, 15, 17, 19, 356/3.01, 3.1, 3.16, 623
See application file for complete search history.

(56) References Cited

U.S. PATENT DOCUMENTS 5,282,016 A * 1/1994 Shen et al. ............... 356/400
5,923,418 A * 7/1999 Clark et al. .............. 356/153
6,288,381 B1 * 9/2001 Messina .................. 250/201.1

(Continued)

FOREIGN PATENT DOCUMENTS

WO   85/00688 A1   2/1985
WO   2009/120847 A1   10/2009
WO   2009120847 A1   10/2009

OTHER PUBLICATIONS

Extended European Search Report dated Dec. 22, 2011 of European Application No. 11171062.0 filed Jun. 22, 2011 (7 pages).

*Primary Examiner* — Que T Le
*Assistant Examiner* — Jennifer Bennett
(74) *Attorney, Agent, or Firm* — Burns & Levinson LLP; Joseph M. Maraia

(57) ABSTRACT

An off-axis telescope having a primary optical element configured to reflect an energy beam from an optical reference source that emits the energy beam along an optical path. The telescope includes angle sensors arranged on a periphery of the primary optical element to determine angular motion of the energy beam from the optical reference source. The angle sensors are operable to be biased to positional settings associated with a desired pointing direction of the energy beam. A secondary optical element is arranged in the optical path and translated along three orthogonal axes. A plurality of steering mirrors arranged between the optical reference source and the secondary optical element is configured to be tilted in response to a control signal. A controller auto-aligns the telescope by at least translating the secondary optical element and tilting the steering mirrors via the control signal using at least inputs from the plurality of angle sensors.

23 Claims, 26 Drawing Sheets

(56) References Cited

U.S. PATENT DOCUMENTS

| | | |
|---|---|---|
| 8,203,109 B2 * | 6/2012 | Taylor et al. ............... 250/203.2 |
| 2003/0141466 A1 * | 7/2003 | Ohtomo et al. .......... 250/559.38 |
| 2003/0206350 A1 * | 11/2003 | Byren et al. .................. 359/613 |
| 2008/0042042 A1 | 2/2008 | King et al. |
| 2009/0147238 A1 * | 6/2009 | Markov et al. .................... 356/3 |

* cited by examiner

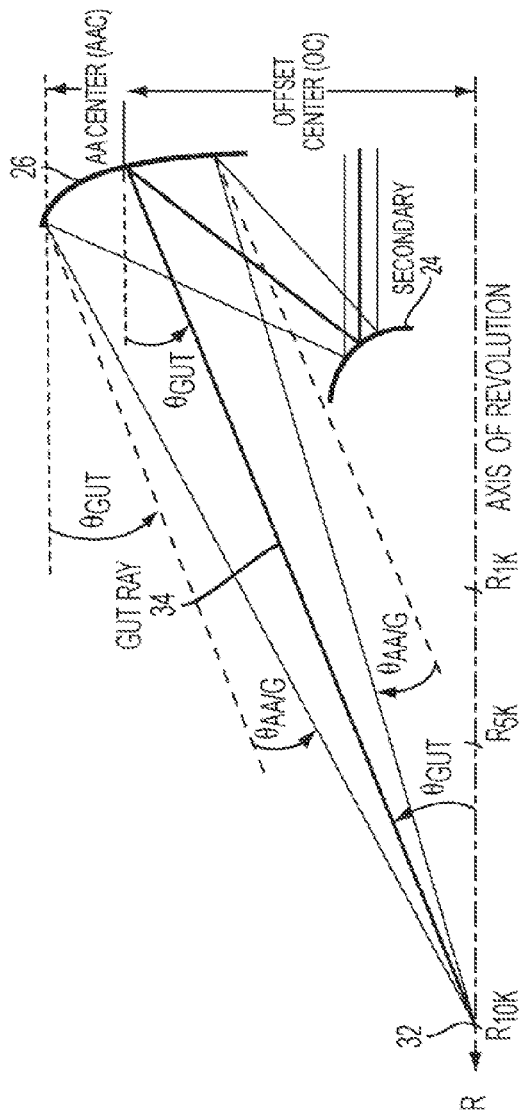

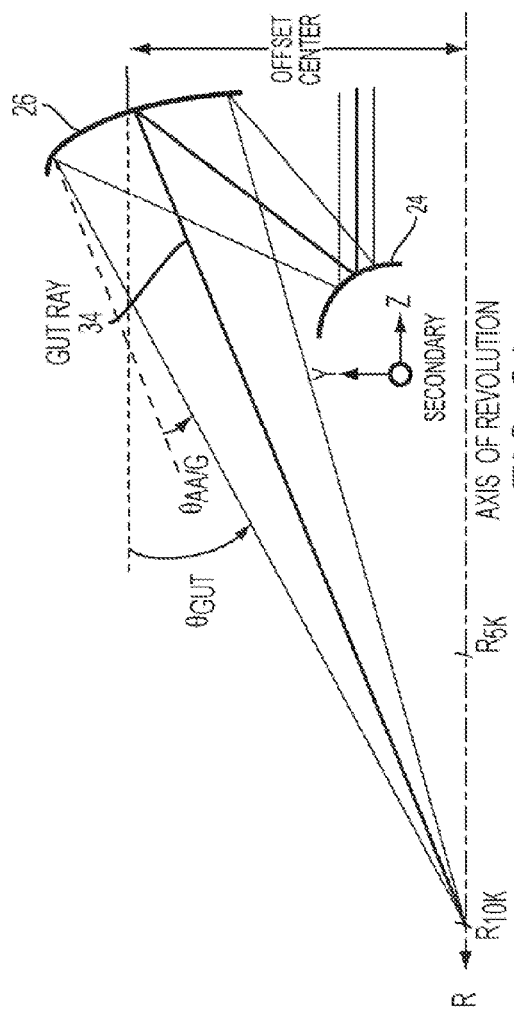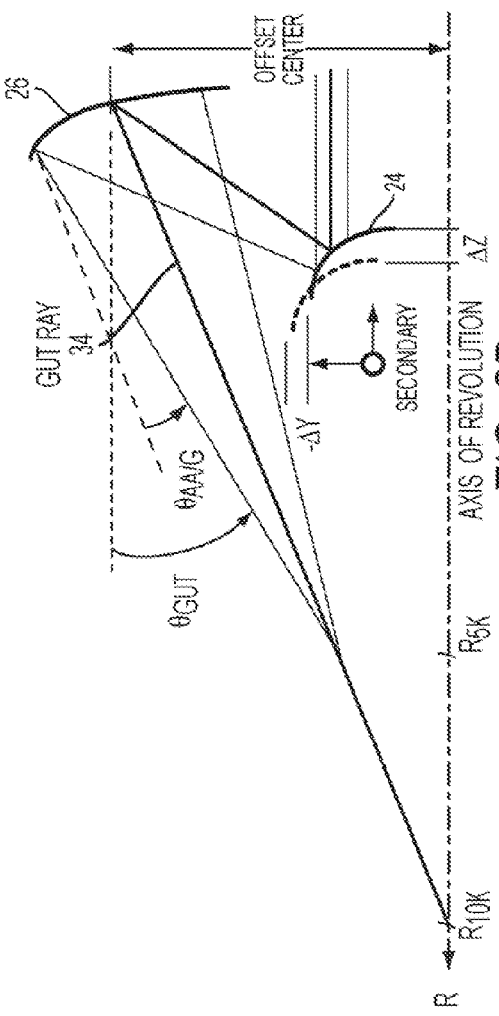

$\theta_{AA/G} = 10^{\wedge}(LOG\ b + m\ LOG\ R)\ b_{AAEQ} = 165\ \mu r,\ a_{AAEQ} = 16.5\ \mu r,\ m = -1$ $m = (LOG\ b - LOG\ a)/(LOG\ R_b - LOG\ R_a)$ $\theta_{AA2,AA3} = 10^{\wedge}(LOG\ 171.913 - 1.01782\ LOG\ R)$ $\theta_{AA1} = 10^{\wedge}(LOG\ 145.208 - 0.9445\ LOG\ R)$

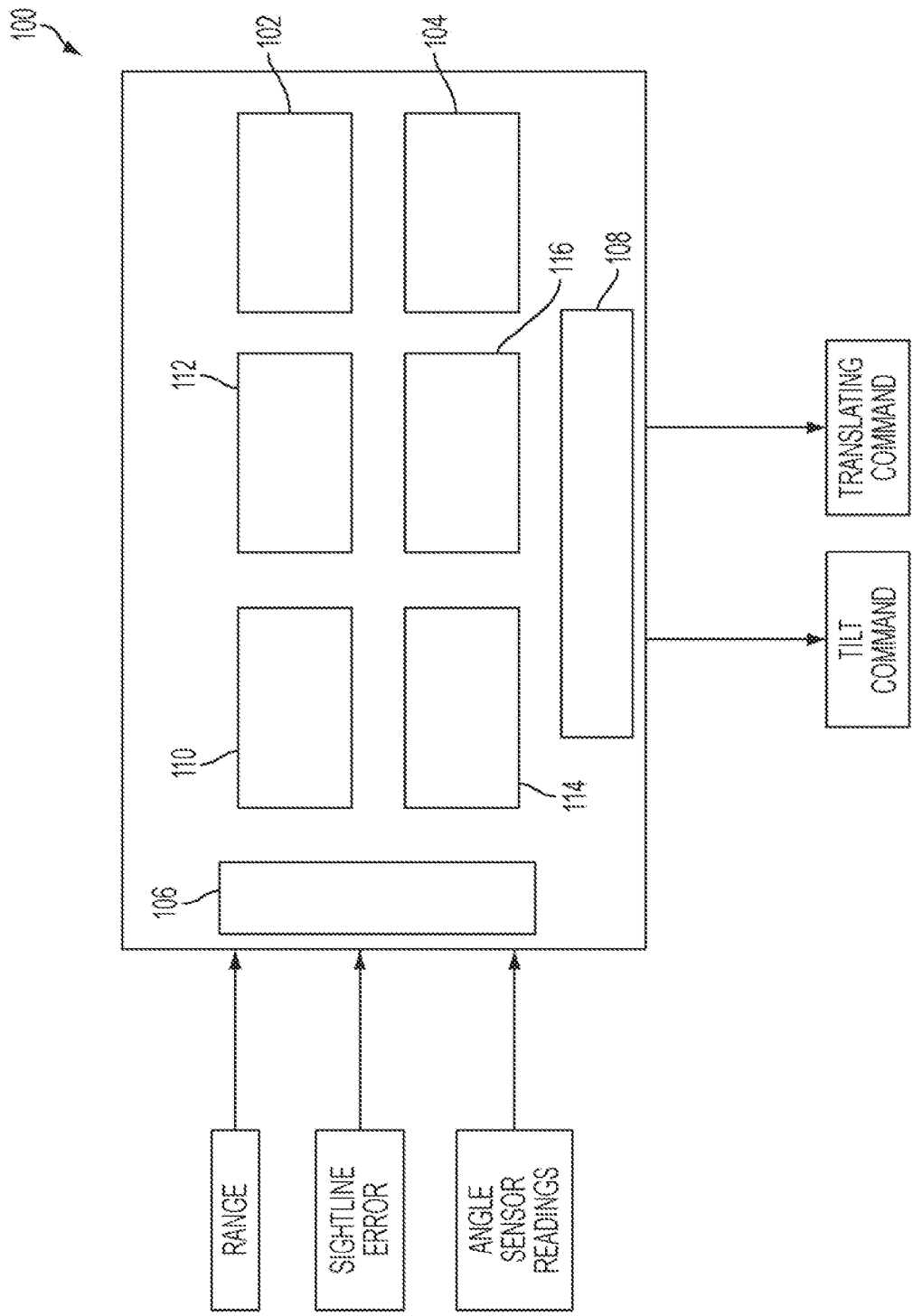

SYSTEM FOR AUTOMATIC ALIGNMENT, STABILIZATION, AND FOCUS FOR AN OFF-AXIS TELESCOPE USING BIASED ANGLE SENSORS

BACKGROUND

This disclosure relates generally to the field of optics and, more specifically, to systems and methods for automatically aligning, stabilizing, and focusing high-power beams of electromagnetic energy.

High power lasers are being considered for a variety of industrial, commercial, and military applications, including materials processing, satellite imaging, target tracking and identification, and directed energy weapons (DEW). Laser DEW systems generally involve the use of a high energy laser (HEL) to irradiate and destroy a target. To achieve performance objectives, many of these applications require that the energy beam be accurately steered and optimally focused on a target. HEL can be used with a telescope system to steer and focus the energy beam onto a target.

Auto-alignment systems have been implemented for on-axis telescope systems to optimally steer and focus the energy beam onto a target. The conventional auto-alignment systems are based on the assumption that the line of sight (LOS) of the directed energy beam is independent of the range of the target. However, for an off-axis telescope system, the alignment of the energy beam (LOS) is range-dependent. Accordingly, a conventional auto-alignment system cannot optimally auto-align and focus the energy beam of the off-axis telescope.

Thus, a need exists in the art for an improved system or method for auto-aligning and focusing an energy beam of the off-axis telescope. This can be achieved with an articulated secondary mirror in the telescope, together with two or more steering mirrors.

SUMMARY

One aspect provides an off-axis telescope having a primary optical element configured to reflect an energy beam from an optical reference source. The energy beam is emitted from the optical reference source along an optical path. The telescope also includes a plurality of angle sensors arranged on a periphery of the primary optical element so as to determine angular motion of the energy beam from the optical reference source reflected off the primary optical element, wherein the angle sensors are operable to be biased (i.e., offset in the position of the angle sensors to shift the null position settings of the angle sensors) to positional settings associated with a desired pointing direction of the energy beam. The telescope further includes a secondary optical element arranged in the optical path and configured to be translated along three orthogonal axes and a plurality of steering mirrors arranged between the optical reference source and the secondary optical element that is configured to be tilted about two perpendicular axes in response to a control signal. The telescope also includes a controller that auto-aligns the telescope by at least translating the secondary optical element and tilting the steering mirrors via the control signal using at least inputs from the plurality of angle sensors.

Another aspect provides a method of auto-aligning an off-axis telescope having a primary optical element, a secondary optical element, and a plurality of steering mirrors. The secondary optical element is configured to be translated in three orthogonal axes, and the steering mirrors are configured to be tilted about two perpendicular axes. The method includes the steps of obtaining the range of target and determining a desired pointing direction of an energy beam from an optical reference source relative to the axis of revolution of the off-axis telescope based at least on the range. The method also includes the step of biasing a plurality of angle sensors configured to determine angular motion of the energy beam to angular positions associated with the desired pointing direction of the energy beam based on the range of the target. The method further includes the steps of steering and focusing the energy beam along the desired pointing direction onto the target by at least translating the secondary optical element and tilting the steering mirrors.

Another aspect provides an article of manufacture having a tangible computer readable medium having computer-executable instructions thereon for execution by a processor, which, when executed by the processor, carry out the functions of auto-aligning an off-axis telescope having a primary optical element, a second optical element, a plurality of steering mirrors. The functions include obtaining the range of target and determining a desired pointing direction of an energy beam from an optical reference source relative to the axis of revolution of the telescope based at least on the range. The functions also include biasing a plurality of angle sensors configured to determine angular motion of the energy beam to angular positions associated with the desired pointing direction of the energy beam based on the range of the target. The functions further include steering and focusing the energy beam along the desired pointing direction onto the target by at least translating the secondary optical element and tilting the steering mirrors.

Another aspect provides a controller suitable for closed loop auto-alignment of an off-axis telescope. The controller includes a memory storage component that stores data relating to the auto-alignment and an input module that receives a range input, a sightline error input, and angle sensor readings input for storage in the memory storage component. The controller also includes a processor coupled to the memory storage component and configured to provide the closed loop control by processing the data stored in the memory storage component. The controller further includes an output module that outputs a translating command and a tilting command in response to the range input and angle sensor readings input and a tilt module that tilts a plurality of steering mirrors via the tilting command in response to the range input and angle sensor readings input. The controller also includes a translation module that translates a secondary optical element via the translating command in response to the range input and angle sensor readings input. The controller also includes an inertial stabilization module that inertially stabilizes a line-of-sight of the telescope in response to the sightline error input and a centering module that centers the energy beam at a desired position on the secondary optical element.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

FIGS. 7a-7b illustrate exemplary radial angles relative to a gut ray and equations used to calculate the angles relative to the gut ray, respectively;

FIG. 8a-8b illustrate an exemplary movement of a secondary optical element for focus;

FIG. 25 illustrates a controller suitable for closed loop control of the off-axis telescope in accordance with an embodiment.

DETAILED DESCRIPTION

Figure 1:
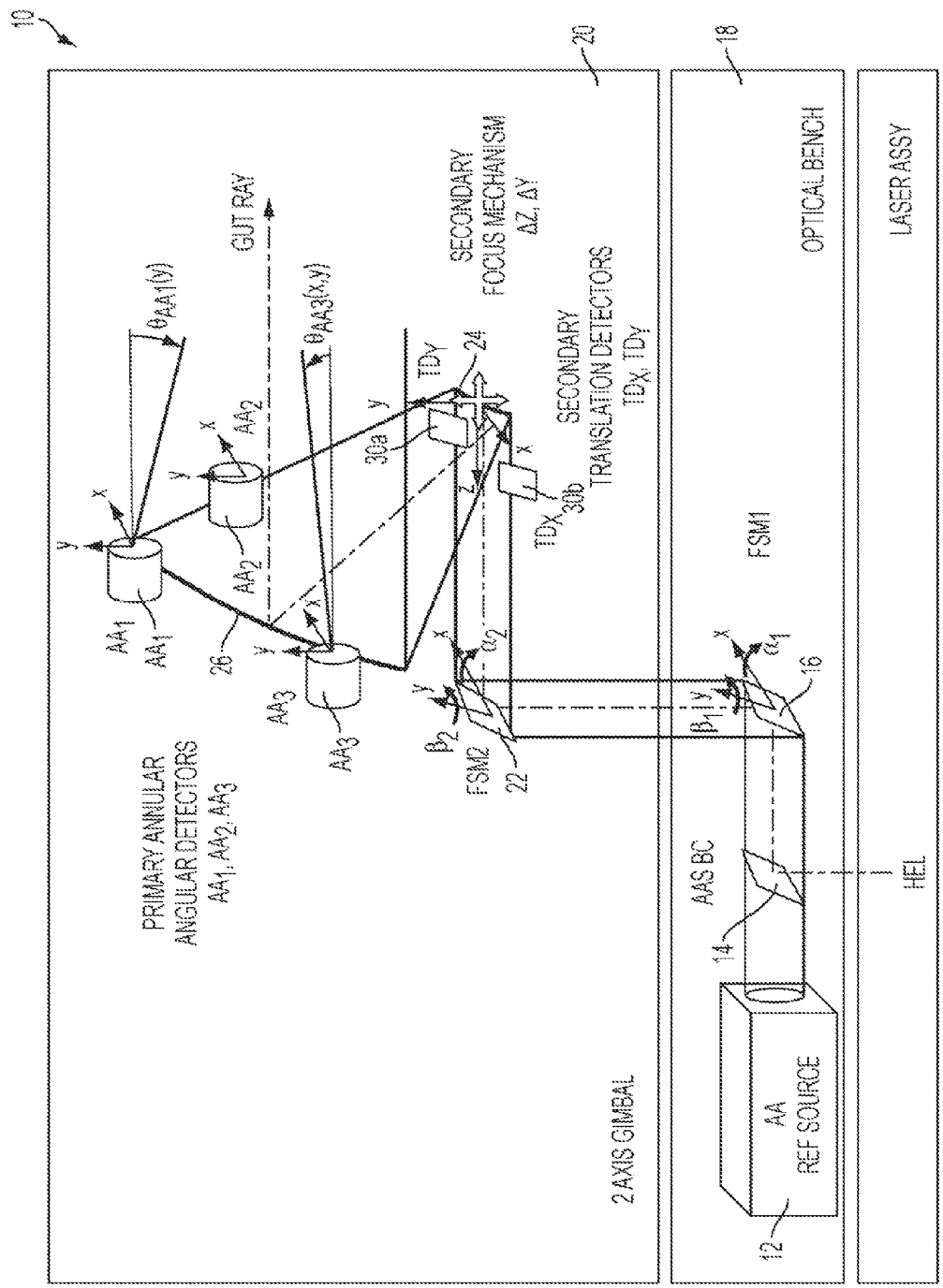
FIG. 1 is a schematic exemplary of components of an off-axis telescope system of an embodiment.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 is a schematic illustration of an auto-alignment configuration for an off-axis telescope system 10. In the illustrated embodiment, a high energy laser (HEL) is located on a laser assembly that is off the optical bench 18. HEL is configured to emit a beam that is co-aligned and combined with an annular beam emitted from optical reference source 12 on optical bench 18 along an optical path. The beams may be combined via a beam combiner (AAS BC) 14. It is contemplated that the beams may have other configurations, and do not necessarily need to be circular. The beams may be steered by first 2-axis fast steering mirror (FSM 1) 16 off optical bench 18 onto the 2-axis gimbal 20. A second fast steering mirror (FSM 2) 22 on the inner gimbal of the 2-axis gimbal 20 may be configured to steer the beams onto translatable secondary optical element 24, which takes the form of a mirror in this embodiment. In one embodiment, fast steering mirrors may be used to compensate for atmospheric tilts and reduce misalignment in the internal beam path caused by structural compliance, gimbal bearing runout, gimbal axis-non-orthogonality, and base motion disturbances (coupled through striction/friction in the gimbal bearings). The beams may then be reflected off secondary optical element 24 onto primary optical element 26, which also takes the form of a mirror in this embodiment. Primary optical element 26 may then reflect the beam towards target 32 (see FIG. 2).

In the illustrated embodiment, a plurality of angle sensors AA1, AA2, and AA3 may be disposed near or on primary optical element 26. Angle sensors AA1, AA2, and AA3 may be configured to measure the angular motion of the beams from optical reference source 12. In one embodiment, angle sensors AA1, AA2, and AA3 are arranged at 120 degrees around periphery 29 (see FIG. 2) of primary optical element 26. However, it should be appreciated that the number and arrangement of the angle sensors shown in this illustrated embodiment are not intended to be limiting. Referring back to FIG. 1, plurality of secondary translation sensors 30a, 30b may be provided near or on the secondary optical element 24. Secondary translation sensors 30a, 30b may be configured to detect the positioning of the optical reference beam on secondary optical element 24. For example, in one embodiment, secondary translation sensors 30a, 30b are configured to output a null or zero value when the beams are centered at a desired position on secondary optical element 24.

Telescope system 10 may also have controller 100 (see FIG. 25) having memory 102 and processor 104 coupled to memory 102 to process various operations will be described herein.

It is contemplated that in one embodiment, telescope system 10 may have a similar configuration as described in Patent Application No. PCT/US09/38369, which is incorporated herein in its entirety.

Figure 2:
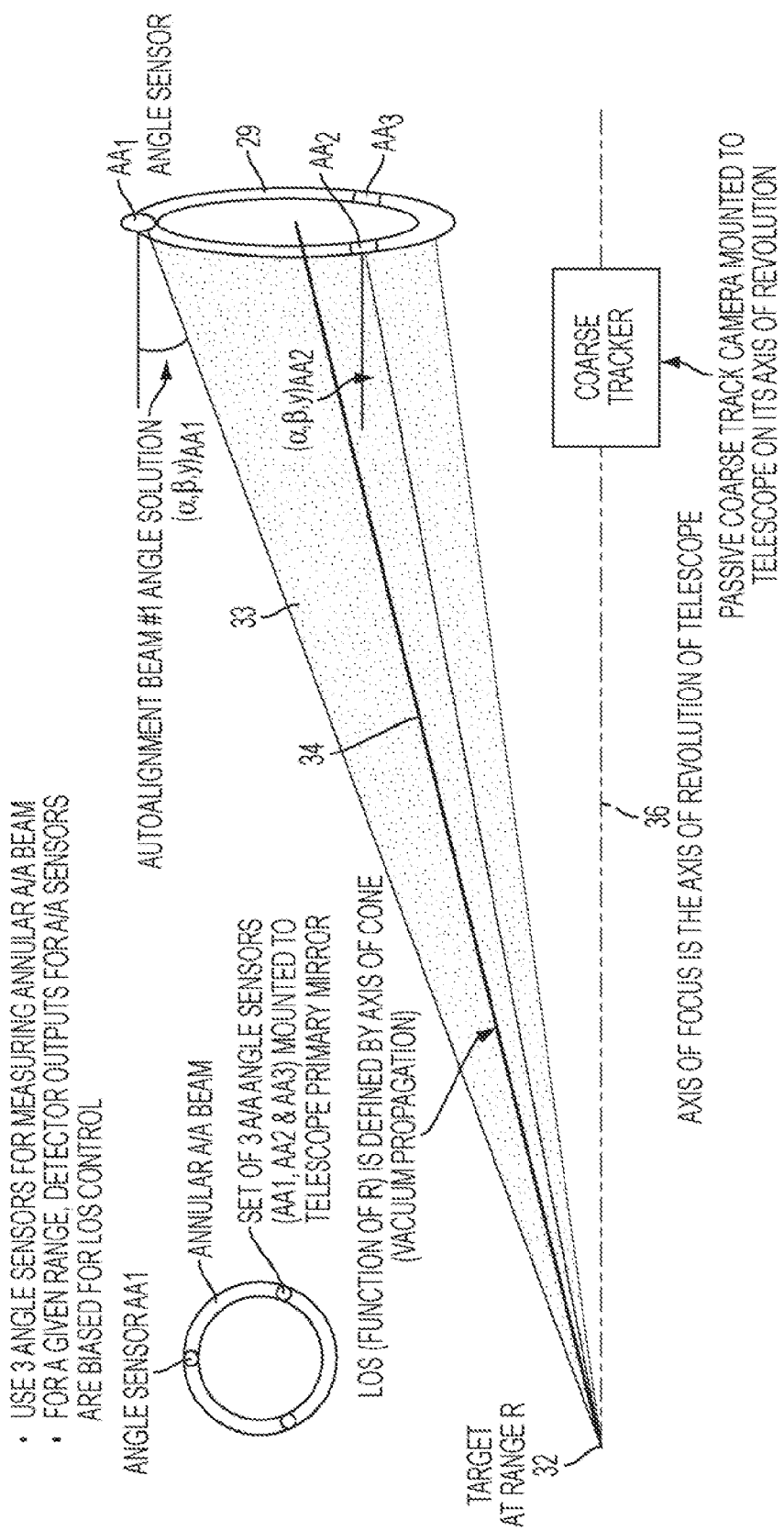
FIG. 2 illustrates an arrangement of sensors of the off-axis telescope system of FIG. 1 with respect to a line of sight or gut ray of an energy beam.

In one embodiment, the HEL beam and annular optical reference beam from primary optical element 26 may generally form the shape of cone 33 when telescope system 10 is ranged and focused on target 32, as shown in FIG. 2. Line-of-sight (LOS) or gut ray 34 of telescope system 10 may be defined by center axis of cone 33. As shown in FIG. 2, target 32 may be located on an axis of focus, which may be defined by axis of revolution 36 of telescope system 10. In other words, to focus telescope system 10 on target 32, LOS 34 should be ranged on the axis of revolution 36. In the illustrated embodiment, passive coarse tracker 38 may be mounted to telescope system 10 on axis of revolution 36. Coarse tracker 38 may be configured to capture target 32 to facilitate telescope system 10 in achieving the desired LOS position. The axis of focus may be defined by an optical prescription of telescope system 10.

Figure 21:
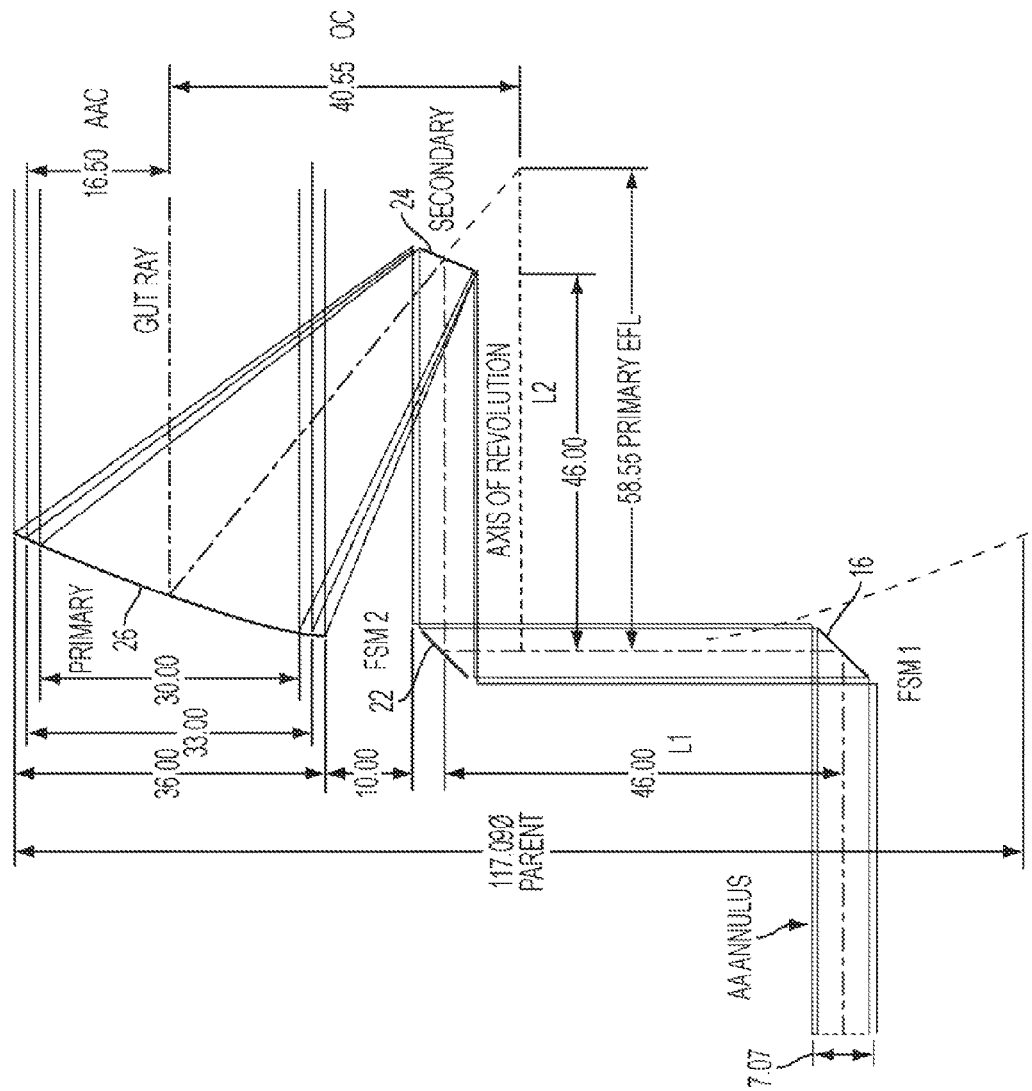
FIG. 21 shows an exemplary prescription of the off-axis telescope in accordance with one embodiment.

In one embodiment, telescope system 10 has the characteristics indicated in Table I which has a prescription as shown in FIG. 21.

TABLE I

Design/Performance Parameters

Range: 10 km (nominal) to 1 km
Elliptical Primary with foci at the object and at where the focus would be if the primary was parabolic
Off-axis Primary size is 36 cm where 30 cm is for the HEL beam.
Primary parent is f/0.5
    HEL footprint on primary is 28 × 28 cm clipped by 30 cm diameter
    AA annulus is 3 cm wide on primary
Parabolic secondary
Incoming HEL laser is 6 × 6 cm
    Magnification 28 cm/6 cm = 4.667X
Output AA beams center situated at 33 cm spaced 120° apart off of Primary
    Output AA Center Radius (AAC) from gut ray 33 cm/2 = 16.5 cm
    Input AA Annulus Reference Source beam gut rays are set along
    33 cm/4.667 = 7.0714 cm diameter
Fold Mirror positions
    Set below Primary with 10 cm clearance between limiting rays to provide sufficient tilt range
    Each mirror set apart by equal axial distance (L1, L2)

As mentioned above, the alignment, and focus of an off-axis telescope is range-dependent. Thus, to achieve the desired LOS position, telescope system 10 should account for the range when positioning LOS 34. In one embodiment, the plurality of sensors AA1, AA2, AA3 may each be biased or offset to positional settings $(\alpha, \beta, \gamma)A_1$, $(\alpha, \beta, \gamma)A_2$, $(\alpha, \beta, \gamma)A_3$, respectively. These positional settings may be dependent on the range and may be set such that a ranged and focused beam that achieves the desired LOS may be sensed by the sensors AA1, AA2, and AA3 as a null. In one embodiment, the positional settings of the sensors AA1, AA2, AA3 that are dependent on range may be calculated and achieved using a HEXAGON (Handy Expert Application for General Purpose Optical Analysis) modeling analysis, as shown in table II below:

TABLE II

| Range | Key | Secondary and Fold Mirror Compensation | | | | Gut (global) and AA (local to Gut) ray information | | | | | |
|---|---|---|---|---|---|---|---|---|---|---|---|
| | | Y (cm) | Z (cm) | α1 (°) | α2 (°) | Y (cm) | (cm) | R (cm) | YA (μr) | A (μr) | RA (μr) |
| 10 km | COMP | 0.000000 | 0.000000 | −0.000336 | −0.000336 | | | | | | |
| | GUT | | | | | 40.550 | 0.000 | 40.550 | −40.548 | 0.000 | 40.548 |
| | AA1 | | | | | 16.501 | 0.000 | 16.501 | −16.500 | 0.000 | 16.500 |
| | AA2 | | | | | −8.250 | 14.290 | 16.501 | 8.250 | −14.289 | 16.500 |
| | AA3 | | | | | −8.250 | −14.290 | 16.501 | 8.250 | 14.289 | 16.500 |
| 9 km | COMP | −0.000300 | 0.000381 | −0.000916 | −0.001518 | | | | | | |
| | GUT | | | | | 40.550 | 0.000 | 40.550 | −45.053 | 0.000 | 45.053 |
| | AA1 | | | | | 16.501 | 0.000 | 16.501 | −18.090 | 0.000 | 18.090 |
| | AA2 | | | | | −8.250 | 14.290 | 16.501 | 9.273 | −15.913 | 18.418 |
| | AA3 | | | | | −8.250 | −14.290 | 16.501 | 9.273 | 15.913 | 18.418 |
| 8 km | COMP | −0.000674 | 0.000857 | −0.001641 | −0.002996 | | | | | | |
| | GUT | | | | | 40.550 | 0.000 | 40.550 | −50.684 | 0.000 | 50.684 |
| | AA1 | | | | | 16.500 | 0.000 | 16.500 | −20.078 | 0.000 | 20.078 |
| | AA2 | | | | | −8.250 | 14.290 | 16.501 | 10.551 | −17.943 | 20.815 |
| | AA3 | | | | | −8.250 | −14.290 | 16.501 | 10.551 | 17.943 | 20.815 |
| 7 km | COMP | −0.001156 | 0.001469 | −0.002573 | −0.004896 | | | | | | |
| | GUT | | | | | 40.550 | 0.000 | 40.550 | −57.925 | 0.000 | 57.925 |
| | AA1 | | | | | 16.500 | 0.000 | 16.500 | −22.633 | 0.000 | 22.633 |
| | AA2 | | | | | −8.250 | 14.291 | 16.501 | 12.195 | −20.552 | 23.898 |
| | AA3 | | | | | −8.250 | −14.291 | 16.501 | 12.195 | 20.552 | 23.898 |
| 6 km | COMP | −0.001798 | 0.002285 | −0.003816 | −0.007430 | | | | | | |
| | GUT | | | | | 40.550 | 0.000 | 40.550 | −67.578 | 0.000 | 67.578 |
| | AA1 | | | | | 16.500 | 0.000 | 16.500 | −26.040 | 0.000 | 26.040 |
| | AA2 | | | | | −8.250 | 14.291 | 16.501 | 14.386 | −24.031 | 28.009 |
| | AA3 | | | | | −8.250 | −14.291 | 16.501 | 14.386 | 24.031 | 28.009 |
| 5 km | COMP | −0.002698 | 0.003428 | −0.005556 | −0.010977 | | | | | | |
| | GUT | | | | | 40.550 | 0.000 | 40.550 | −81.092 | 0.000 | 81.092 |
| | AA1 | | | | | 16.500 | 0.000 | 16.500 | −30.809 | 0.000 | 30.809 |
| | AA2 | | | | | −8.251 | 14.291 | 16.502 | 17.454 | −28.902 | 33.764 |
| | AA3 | | | | | −8.251 | −14.291 | 16.502 | 17.454 | 28.902 | 33.764 |
| 4 km | COMP | −0.004046 | 0.005141 | −0.008166 | −0.016298 | | | | | | |
| | GUT | | | | | 40.550 | 0.000 | 40.550 | −101.360 | 0.000 | 101.360 |
| | AA1 | | | | | 16.499 | 0.000 | 16.499 | −37.963 | 0.000 | 37.963 |

TABLE II-continued

| | | Secondary and Fold Mirror Compensation | | | | Gut (global) and AA (local to Gut) ray information | | | | | |
|---|---|---|---|---|---|---|---|---|---|---|---|
| Range | Key | Y (cm) | Z (cm) | α1 (°) | α2 (°) | Y (cm) | (cm) | R (cm) | YA (μr) | A (μr) | RA (μr) |
| | AA2 | | | | | −8.251 | 14.292 | 16.502 | 22.056 | −36.209 | 42.398 |
| | AA3 | | | | | −8.251 | −14.292 | 16.502 | 22.056 | 36.209 | 42.398 |
| 3 km | COMP | −0.006295 | 0.007997 | −0.012518 | −0.025168 | | | | | | |
| | GUT | | | | | 40.550 | 0.000 | 40.550 | −135.140 | 0.000 | 135.140 |
| | AA1 | | | | | 16.498 | 0.000 | 16.498 | −49.885 | 0.000 | 49.885 |
| | AA2 | | | | | −8.251 | 14.292 | 16.503 | 29.726 | −48.387 | 56.788 |
| | AA3 | | | | | −8.251 | −14.292 | 16.503 | 29.726 | 48.387 | 56.788 |
| 2 km | COMP | −0.010791 | 0.013707 | −0.021225 | −0.042911 | | | | | | |
| | GUT | | | | | 40.550 | 0.000 | 40.550 | −202.700 | 0.000 | 202.700 |
| | AA1 | | | | | 16.497 | 0.000 | 16.497 | −73.725 | 0.000 | 73.725 |
| | AA2 | | | | | −8.251 | 14.294 | 16.504 | 45.063 | −72.742 | 85.569 |
| | AA3 | | | | | −8.251 | −14.294 | 16.504 | 45.063 | 72.742 | 85.569 |
| 1 km | COMP | −0.024282 | 0.030831 | −0.047370 | −0.096174 | | | | | | |
| | GUT | | | | | 40.550 | 0.000 | 40.550 | −405.300 | 0.000 | 405.300 |
| | AA1 | | | | | 16.492 | 0.000 | 16.492 | −145.211 | 0.000 | 145.211 |
| | AA2 | | | | | −8.251 | 14.299 | 16.509 | 91.058 | −145.814 | 171.911 |
| | AA3 | | | | | −8.251 | −14.299 | 16.509 | 91.058 | 145.814 | 171.911 |

Figure 22:
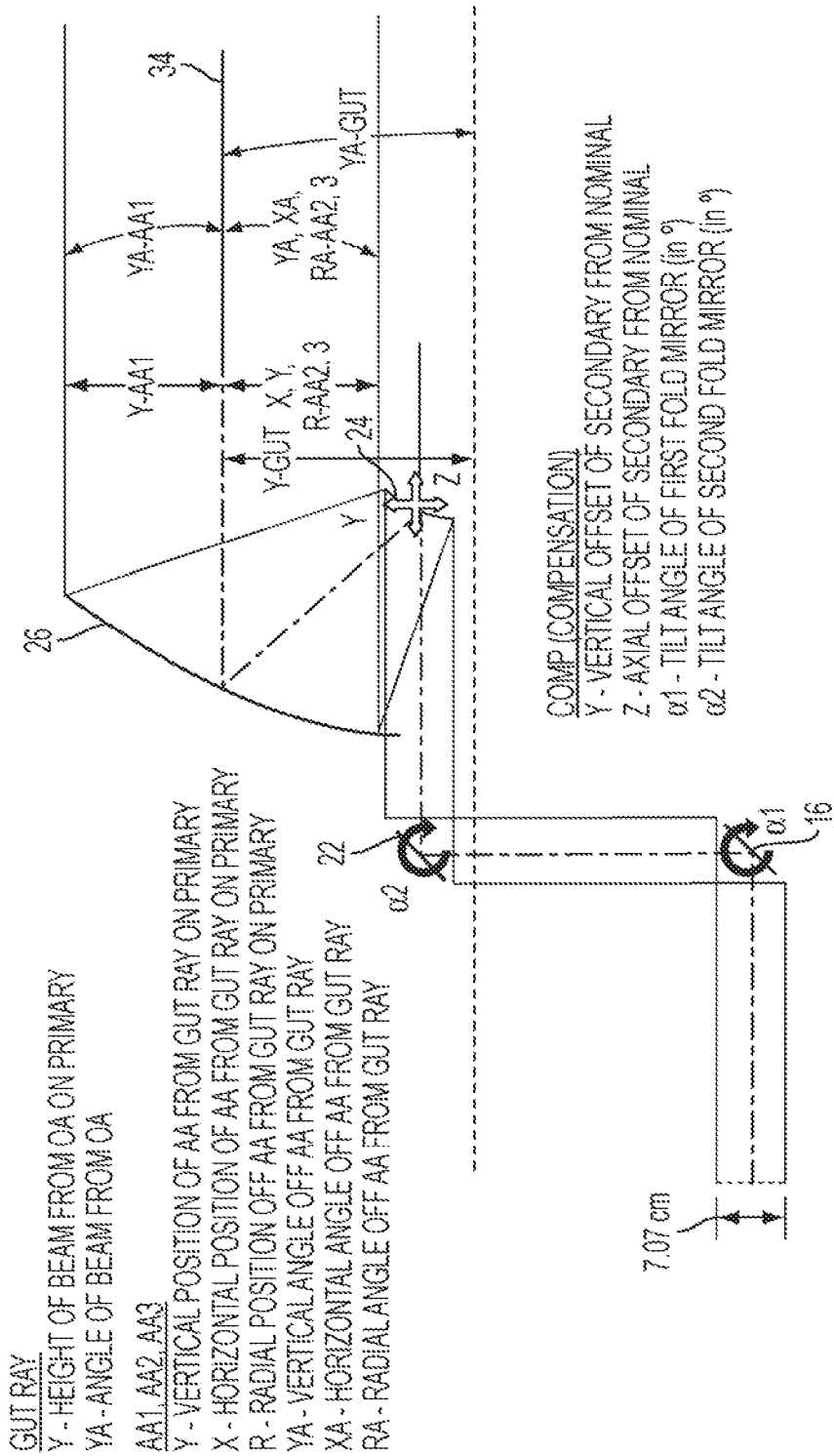
FIG. 22 illustrates exemplary results of a HEXAGON analysis for the off-axis telescope.

FIG. 22 illustrates exemplary HEXAGON variables with respect to the components of telescope system 10.

In one embodiment, to achieve the desired LOS, secondary optical element 24 may be translated for focus and first steering mirror 16 and/or second steering mirror 22 may be moved in response to the range input. Secondary optical element 24 and steering mirrors 16, 22 may be moved according to closed loop auto-alignment control operation 40 (see FIG. 3a).

Figure 3A:
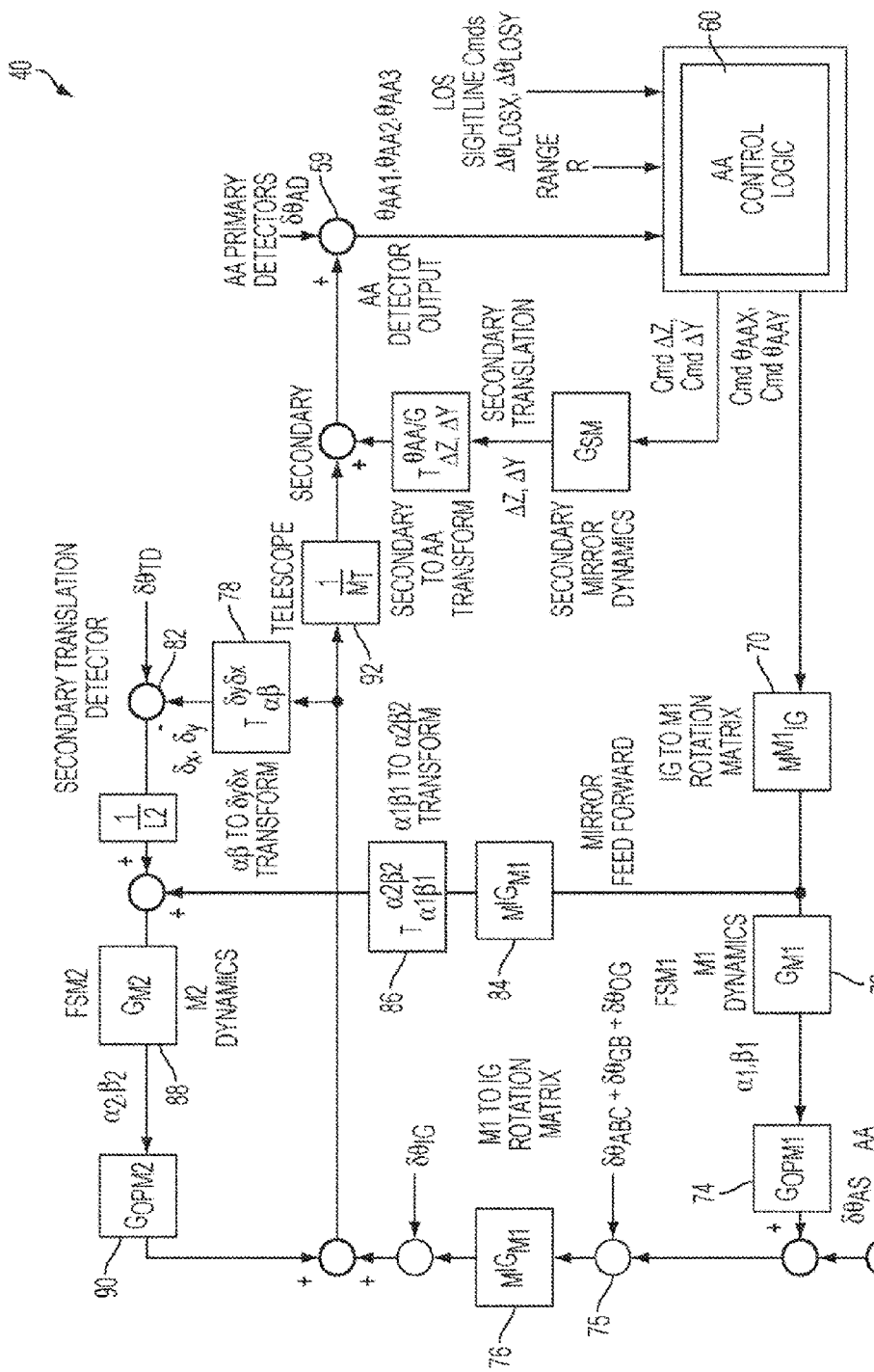
FIG. 3a is a block diagram of a composite closed auto-alignment control loop system of the off-axis telescope.

FIG. 3a illustrates an exemplary closed loop auto-alignment operation 40 that enables the auto-alignment, stabilization, and focusing of telescope system 10. As shown in FIG. 3a, inputs to operation 40 include the range of target 32 and LOS sightline errors ($\Delta\theta_{LOSX}, \Delta\theta_{LOSY}$). Operation 40 also uses outputs from each angle sensor AA1, AA2, and AA3 ($\theta_{AA1}, \theta_{AA2}, \theta_{AA3}$) as inputs. The outputs from angle sensors AA1, AA2, AA3 ($\theta_{AA1}, \theta_{AA2}, \theta_{AA3}$) may include disturbances, which may be accounted for in operation 40. The LOS sightline error command inputs ($\Delta\theta_{LOSX}, \Delta\theta_{LOSY}$) into operation 40 may also be used to compensate for additional disturbances or errors.

Figure 6A:
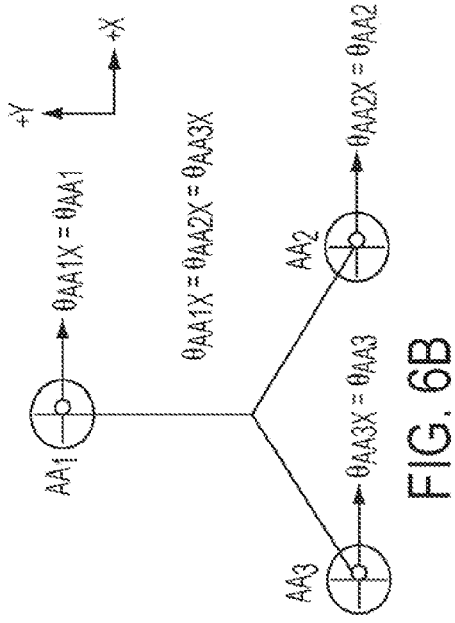
FIG. 6a-6c illustrate various positions of the energy beam on the plurality of sensors in an embodiment.
Figure 6B:
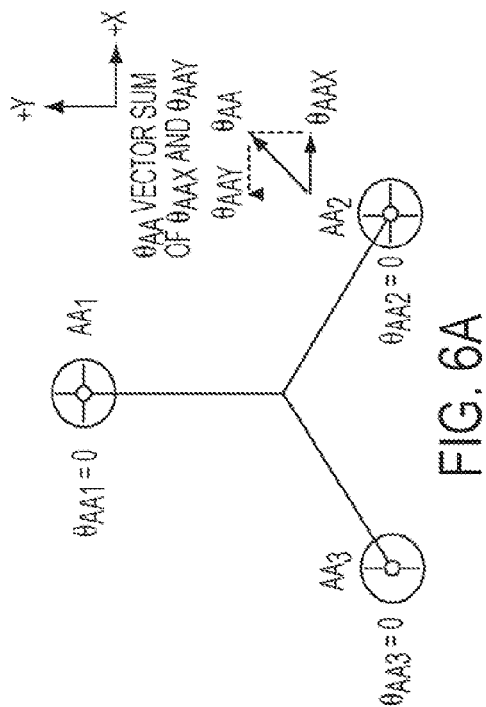
Figure 6C:
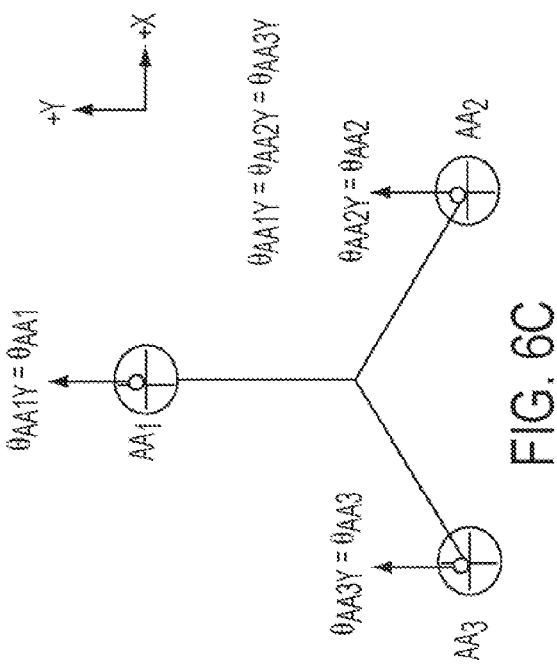

In one embodiment, the LOS sightline errors are generated by gimbal inertial stabilization loops (not shown) to stabilize the beam. The LOS sightline error may be generated by an error sensing source. In one embodiment, the LOS sightline error may be generated by an inertial measurement unit located on primary optical element 26. FIG. 6a shows an embodiment wherein the beam is positioned on angle sensors AA1, AA2, AA3 such that the outputs of sensors A1, A2, and A3 are null. As shown in FIG. 6b, the rotation of the LOS about the y axis based on the LOS sightline command input may move the reference source beam laterally in the x direction on the angle sensors AA1, AA2, AA3. Similarly, the rotation of the LOS about the x-axis based on the LOS sightline command input may move the reference source beam vertically in the y direction on angle sensors AA1, AA2, AA3 as shown in FIG. 6c.

Figure 3B:
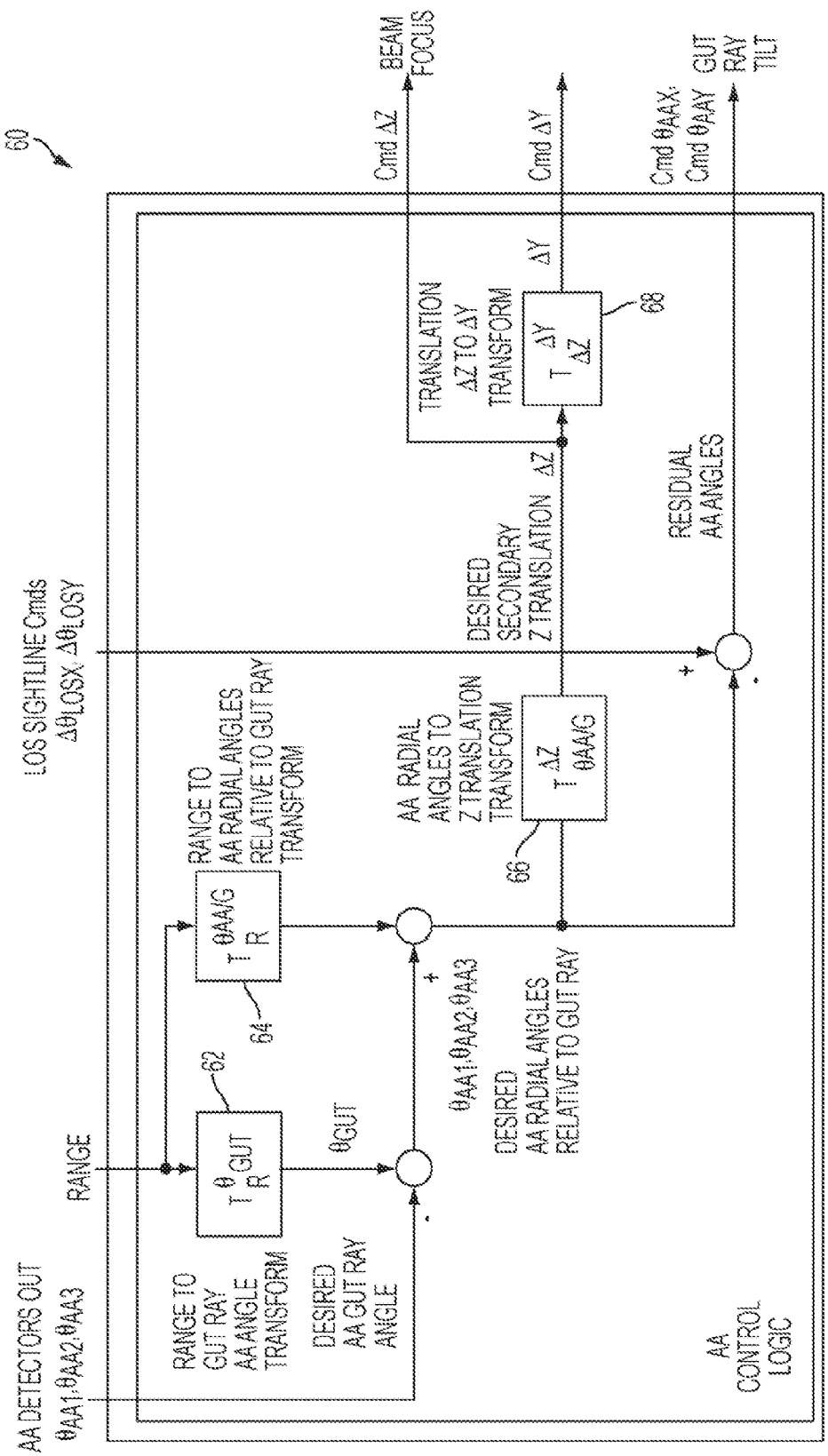
FIG. 3b illustrates a functional control logic operation of an embodiment of FIG. 1.
Figure 4:
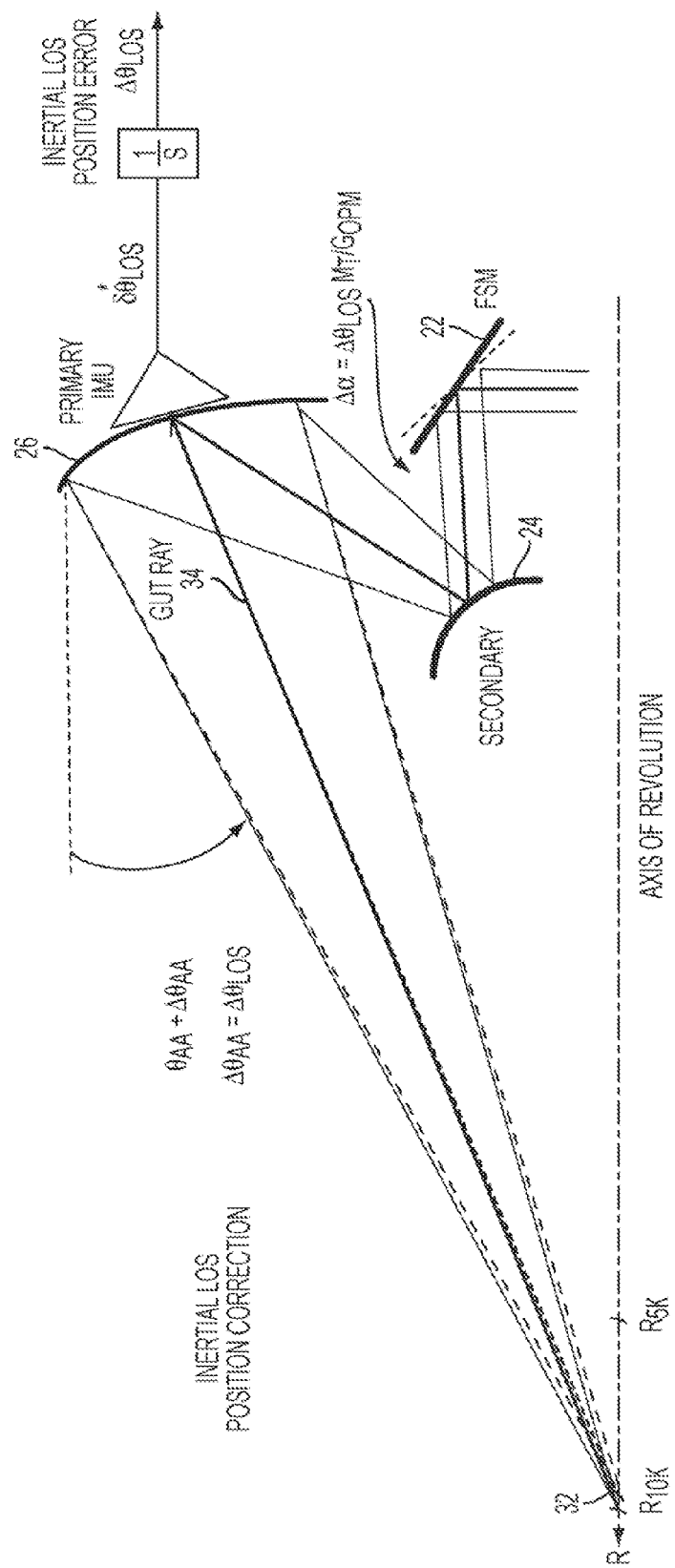
FIG. 4 illustrates the line of sight or gut ray of the energy beam of the off-axis telescope of FIG. 1 while focused on a target.
Figure 13A:
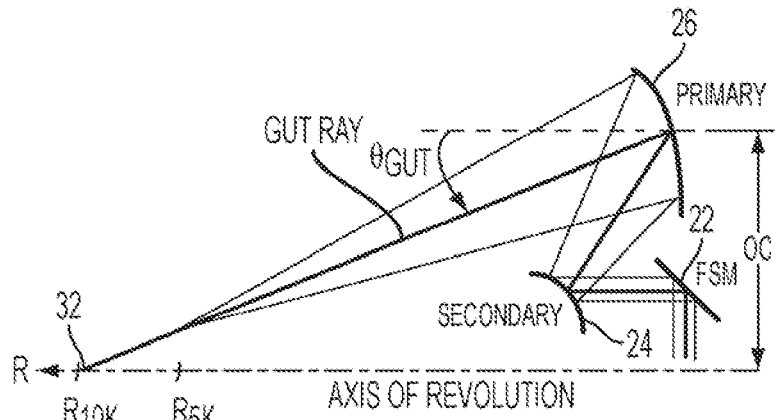
FIGS. 13a-13b illustrate tilt of the line of sight or the gut ray in response to movement of a first steering mirror according to an embodiment.
Figure 13B:
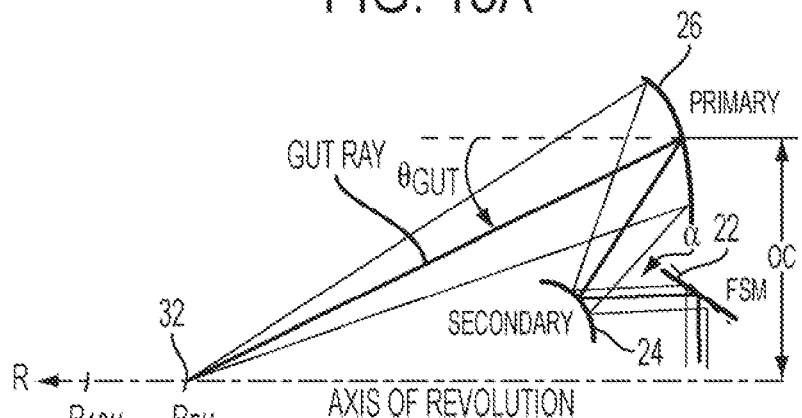
Figure 14:
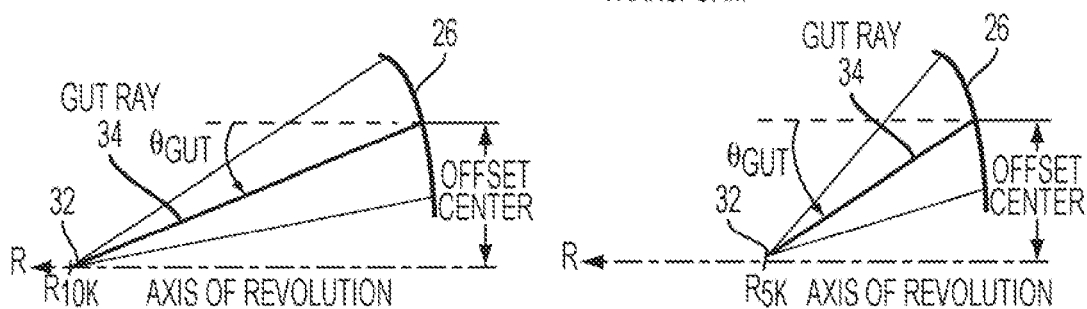
FIG. 14 illustrates an exemplary movement of the line of sight or the gut ray in response to a changing range.
Figure 16:
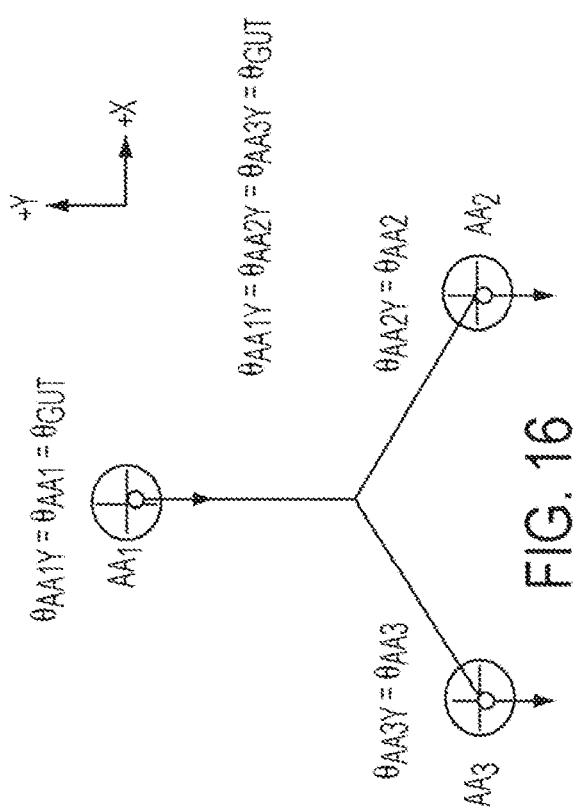
FIG. 16 illustrates an exemplary position of the energy beam on the plurality of sensors in response to the tilting of the gut ray according to an embodiment.
Figure 17A:
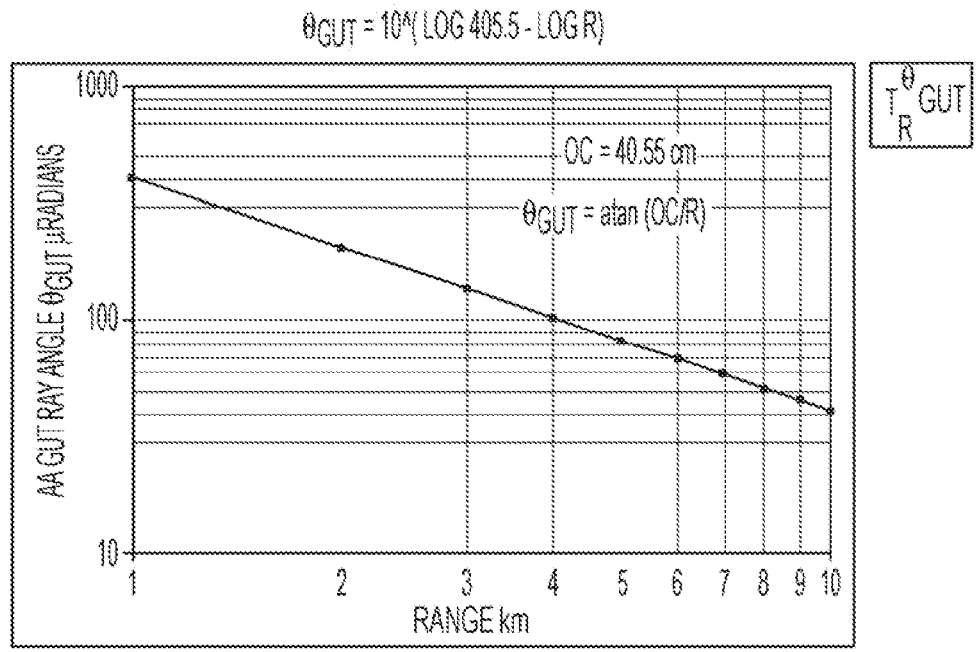
FIGS. 17a-17b illustrate an exemplary gut ray angle as a function of range and gut ray angle as a function of a steering mirror angle, respectively.

Referring back to FIG. 3a, range, outputs from each of the angle sensors A1, A2, and A3 ($\theta_{AA1}, \theta_{AA2}, \theta_{AA3}$), and LOS sightline commands ($\Delta\theta_{LOSX}, \Delta\theta_{LOSY}$) may be inputs to AA control logic operation 60. AA control logic operation 60 is shown in more detail in FIG. 3b. As shown in FIG. 3b, the range is an input to procedure 62, which is a transform operation involving an optical reference source gut ray angle ($\theta_{GUT}$) on the angle sensors AA1, AA2, AA3 as a function of range (R). The gut ray may be equivalent to LOS 34 shown in FIG. 2. FIG. 4 shows the path of gut ray 34 from primary optical element 26 to target 32. In one embodiment, the tilt or movement of steering mirrors 16, 22 may tilt or move gut ray 34, and the movement or tilt of gut ray 34 (which affects $\theta_{GUT}$) may be a function of range, as shown in FIGS. 13a-13b and 14. As shown in one embodiment, the $\theta_{GUT}$ value may be determined by geometrical optics, wherein $\theta_{GUT}=\tan^{-1}(OC/R)$. This value may be similar to the values determined by HEXAGON analysis. As shown in FIG. 16, the tilt of gut ray 34 may move the optical reference source beam vertically on the angle sensors AA1, AA2, and AA3. FIG. 17a shows a plot of gut ray angles $\theta_{GUT}$ as a function of range (R). The output from angle sensors AA1, AA2, AA3 ($\theta_{AA1}, \theta_{AA2}, \theta_{AA3}$) may be compared to desired gut ray angle value $\theta_{GUT}$ to determine the command to steering mirrors 16, 22 (command $\theta_{AAX}, \theta_{AAY}$) such that desired gut ray angle $\theta_{GUT}$ may be achieved. Procedure 62 may be used during tilt control of gut ray 34 to focus at the desired range, which will be described in more detail later. In other words, procedure 62 and the resulting commands for steering mirrors 16, 22 (command $\theta_{AAX}, \theta_{AAY}$) may be used to control the tilt of gut ray 34.

Range is also used in procedure 64, which is a transform operation involving optical reference source radial angles ($\theta_{AA/G}$) relative to the gut ray as a function of range (R). Radial angles relative to the gut ray ($\theta_{AA/G}$) are shown in FIG. 7a and may be used to determine the movement or translation of secondary optical element 24. Referring back to FIG. 3b, procedure 66 is a transform operation involving z-axis translation ($\Delta Z$) of secondary optical element 24 as a function of optical reference source radial angle relative to the gut ray ($\theta_{AA/G}$) on angle sensors AA1, AA2, AA3. Procedure 68 is a transform operation involving y-axis translation ($\Delta Y$) of secondary optical element 24 as a function of z-axis translation ($\Delta Z$) of secondary optical element 24. These y-axis ($\Delta Y$) and z-axis translation ($\Delta Z$) command values are outputs from AA control loop operation 60 to the other procedures in composite auto-alignment operation 40. Procedures 64, 66, and 68 may be used for translation control of secondary optical element 24 to focus at the desired range. In other words, procedures 64, 66, and 68 and the resulting y-axis translation ($\Delta Y$) and z-axis translation ($\Delta Z$) command values may be used to focus the beams.

In operation 60 shown in FIG. 3b, y-axis translation ($\Delta Y$) and z-axis translation ($\Delta Z$) command values determine the movement or translation of secondary optical element 24, and commands $\theta_{AAX}, \theta_{AAY}$ determine the movement of first and second steering mirrors 16, 22. It is contemplated that in some embodiments, these calculations may be obtained beforehand and the transform values may be obtained using, for example, a lookup table or equation.

Figure 5:
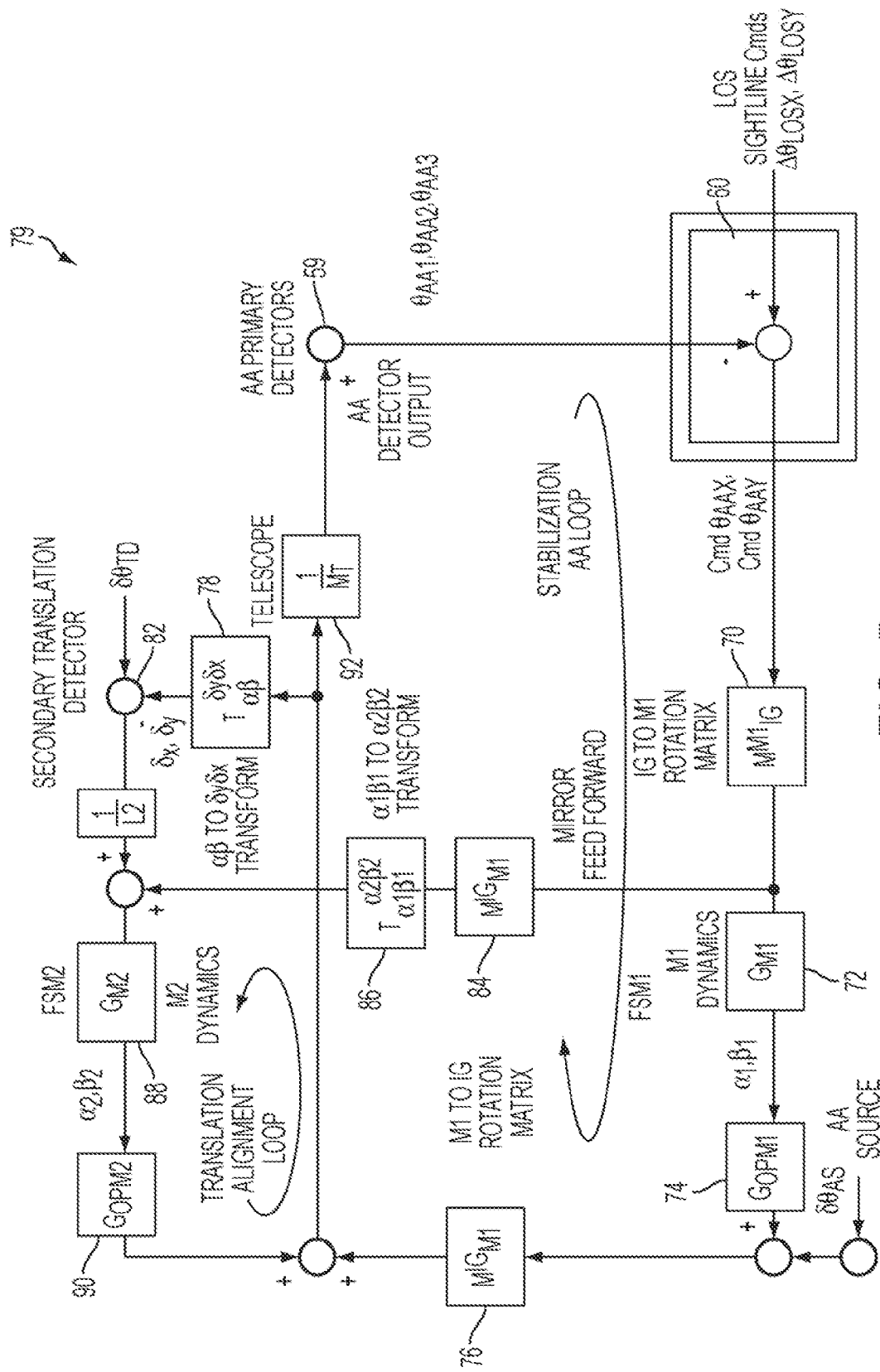
FIG. 5 illustrates an operation for inertially stabilizing the line of sight or gut ray of the energy beam in an embodiment.
Figure 15:
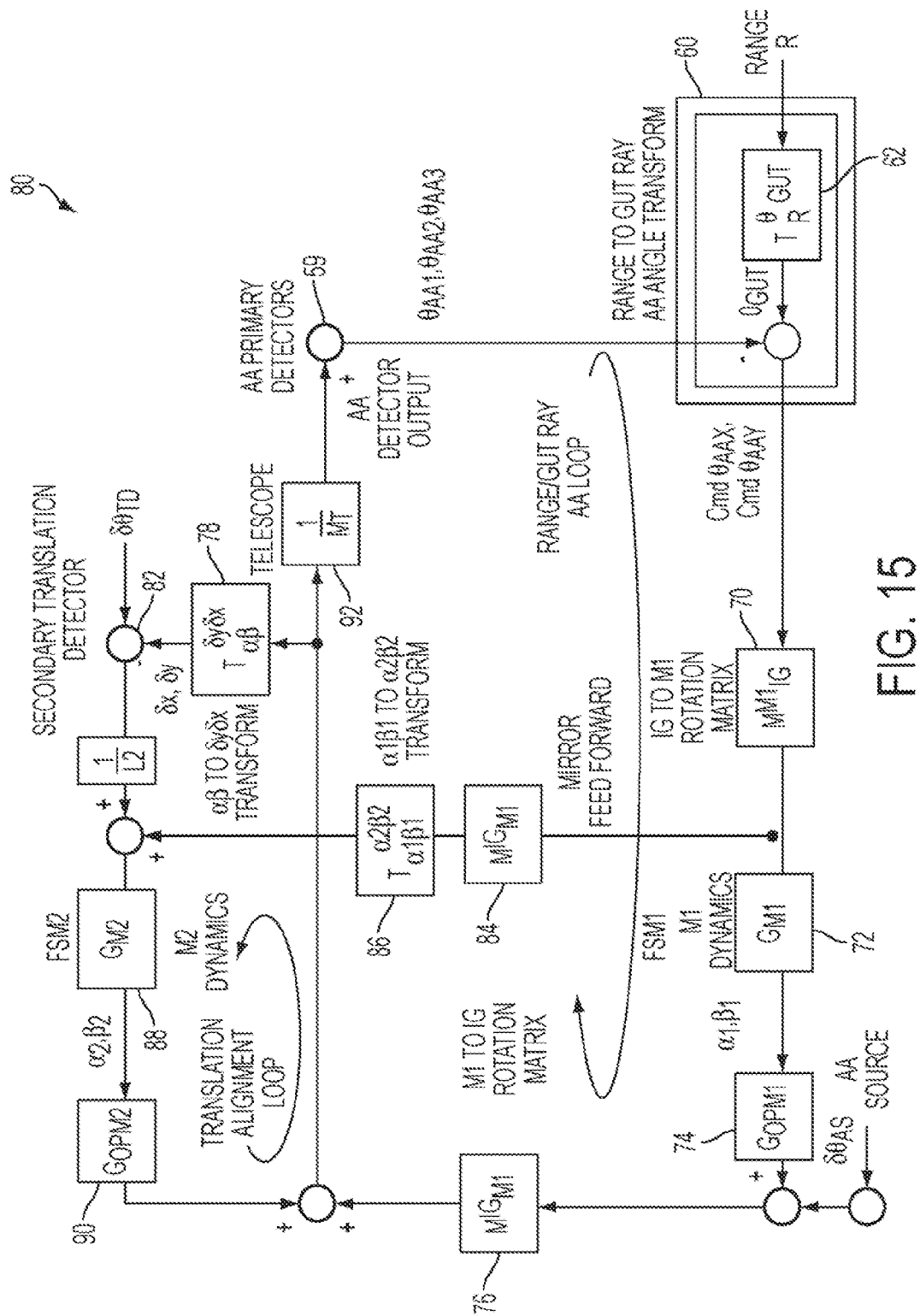
FIG. 15 illustrates an exemplary operation for tilting the gut ray in response to the range input.

As mentioned above, operation 40 shown in FIG. 3a includes several procedures that may occur simultaneously. FIG. 15 shows the portions or procedures of operation 80 for tilting gut ray 34 in response to the range input. Operation 80 and other operations (which will be described later) may be part of operation 40. FIG. 5 shows operation 79 to account for sightline inertial position errors ($\Delta\theta_{LOSX}, \Delta\theta_{LOSY}$), which may be used to inertially stabilize telescope system 10. As shown in FIGS. 13a-13b, angular movement or tilts of steering mirror 22, or steering mirror 16 (not shown), may affect the tilt of gut ray 34. The tilt of gut ray 34 may be a function of range. The tilt of gut ray 34 may move the beam vertically on angle sensors AA1, AA2, and AA3 as shown in FIG. 16. In one embodiment, the gut ray angle on the angle sensors ($\theta_{GUT}$) may be a function of range, as shown in FIG. 17a. These values may be obtained by either HEXAGON analysis or geometrical optics, which provide similar results.

Figure 17B:
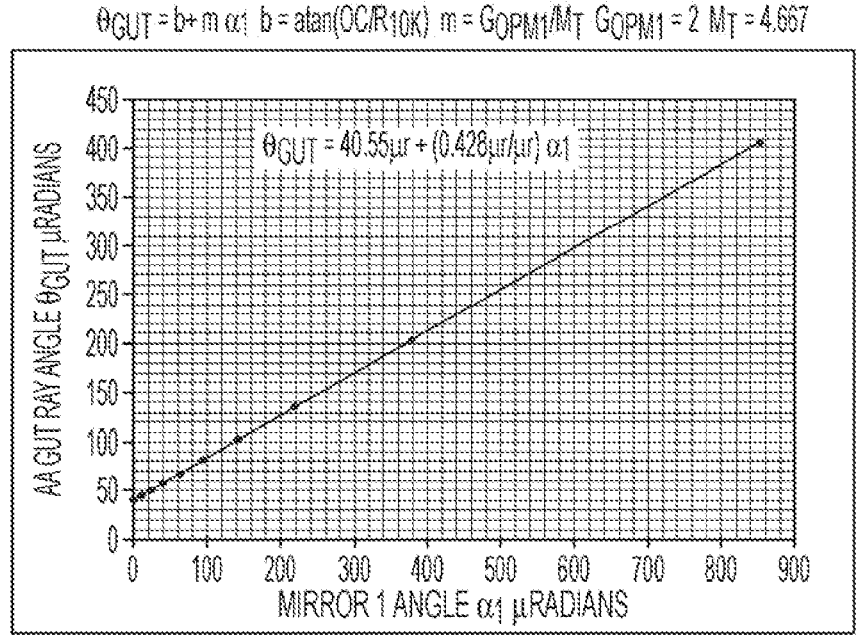
Figure 18:
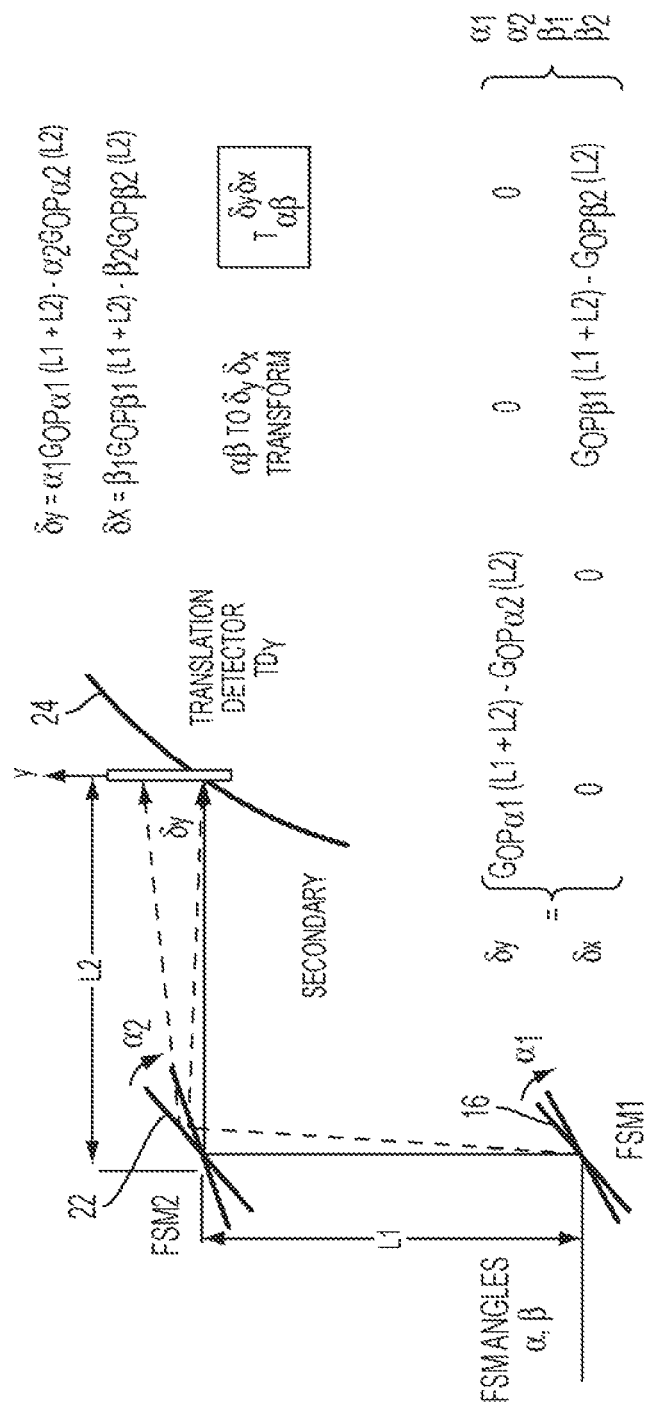
FIG. 18 illustrates an exemplary transform from mirror angles to linear translation on the secondary optical element.
Figure 19:
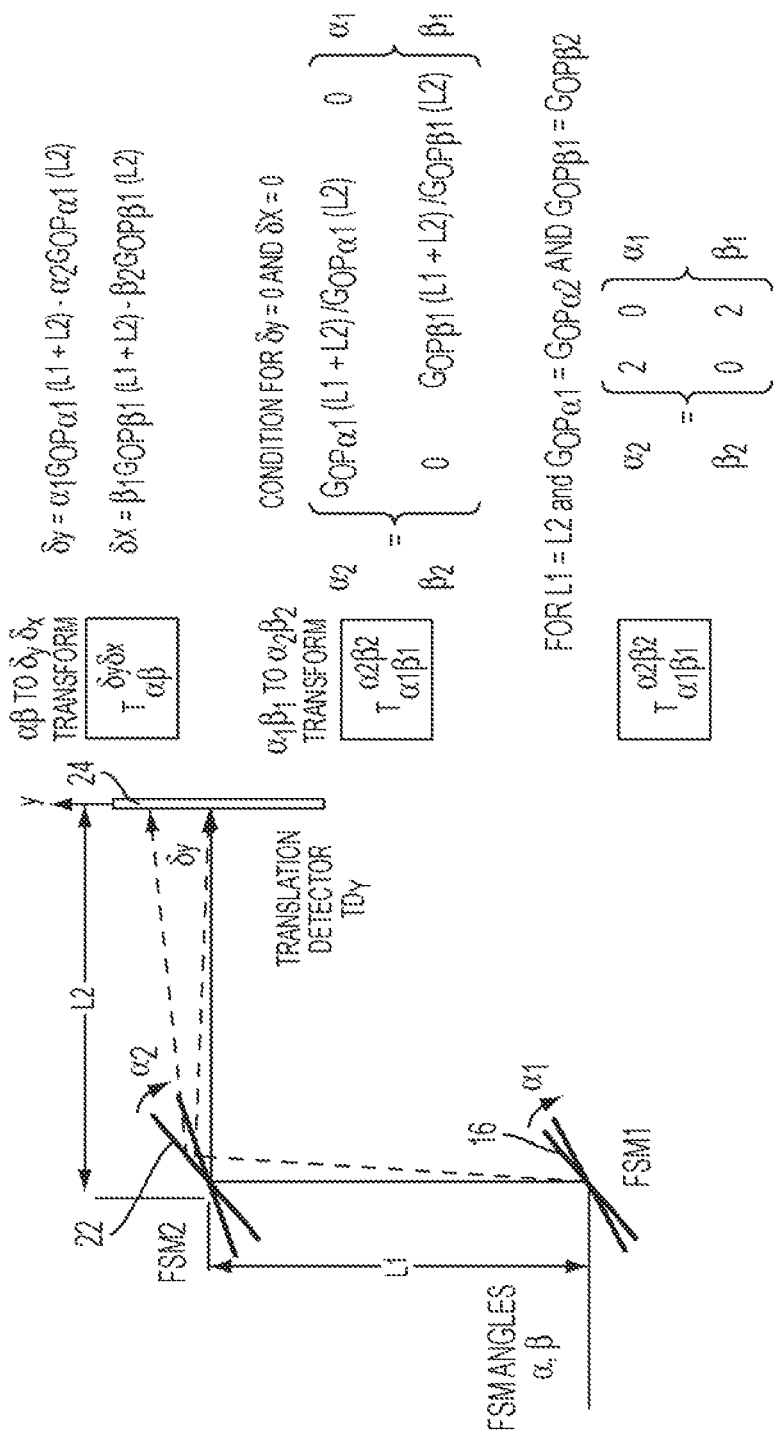
FIG. 19 illustrate an exemplary transform to determine movement of the second steering mirror in response to movement of the first steering mirror.
Figure 20A:
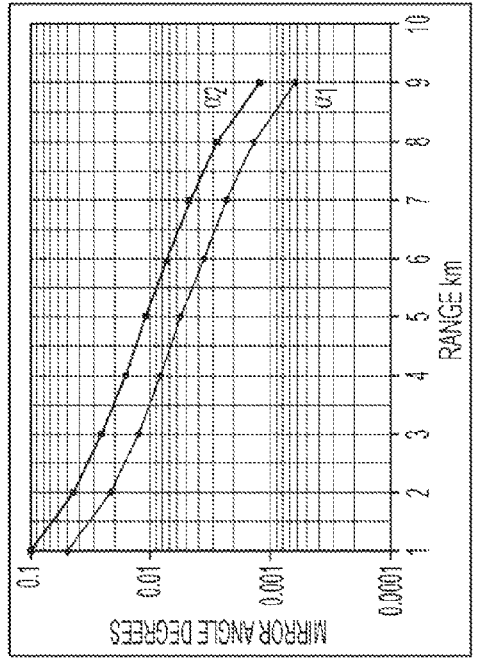
FIG. 20a is an exemplary plot of the second steering mirror angles as a function of the first steering mirror angle.
Figure 23:
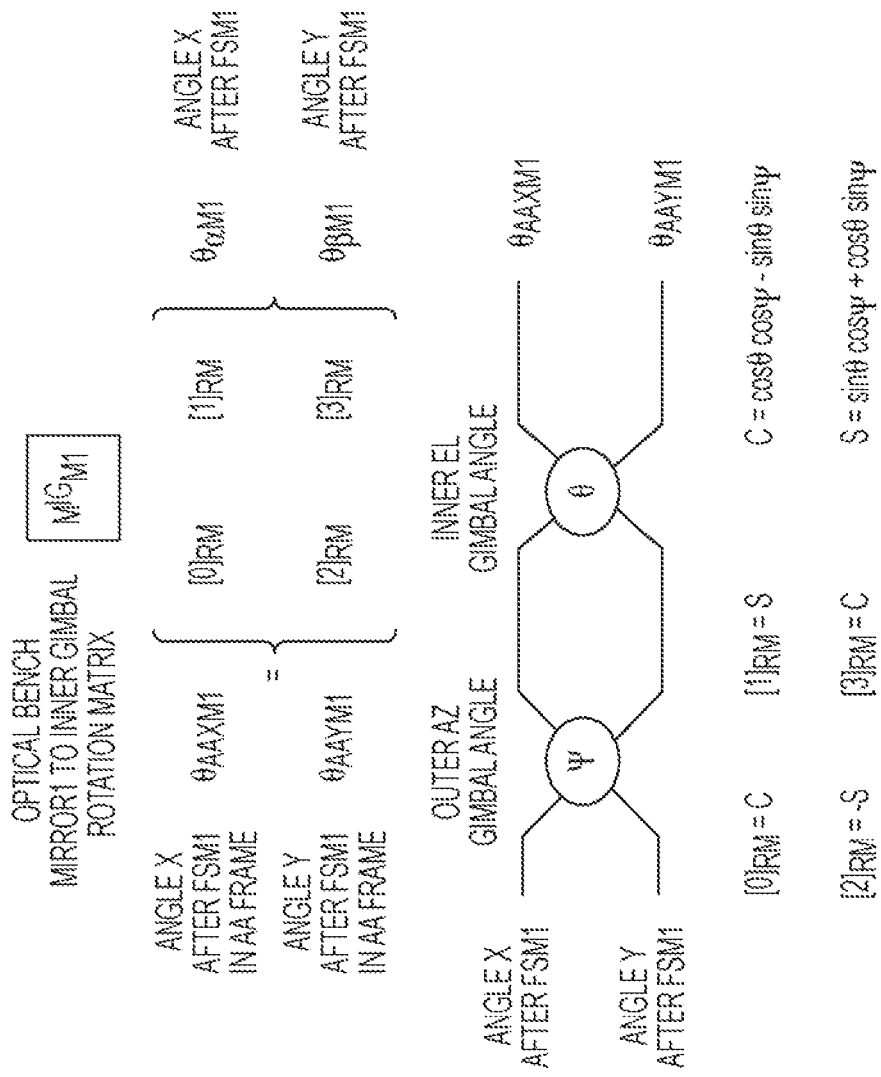
FIG. 23 shows an optical bench mirror to inner gimbal rotation matrix that may be used in an embodiment of the composite closed auto-alignment control loop.
Figure 24:
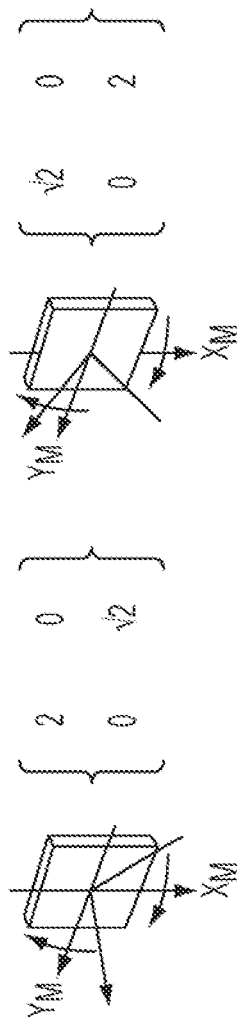
FIG. 24 shows an exemplary mirror optical gain matrix used in a composite closed auto-alignment control loop of an embodiment.

As shown in FIG. 15, the angle sensors may sense the beams from the optical reference source and may output signals ($\theta_{AA1}, \theta_{AA2}, \theta_{AA3}$) in procedure 59. $\delta\theta_{AD}$ (see FIG. 3A) may also be an input into procedure 59, wherein $\delta\theta_{AD}$ represents a dynamic change in angle of the AA angle detectors from their initial angle. The output signals are inputs to operation 60, which includes procedure 62. After procedure 62 has been performed and steering commands $\theta_{AAX}, \theta_{AAY}$ are outputted from operation 60, operation 80 proceeds to procedure 70 wherein an inner gimbal to optical bench mirror rotation matrix is used to adjust the values to compensate for the change from the inner gimbal to first steering mirror 16 on the optical bench. The inner gimbal to optical bench mirror rotation matrix is the inverse of the optical bench mirror to inner gimbal rotation matrix shown in FIG. 23. Operation 80 then proceeds to procedure 72 wherein the compensation values of mirror 16 ($\alpha_1, \beta_1$) are obtained. Procedure 72 involves an open loop or closed loop transform from steering mirror command voltage to steering mirror angle $\alpha1, \beta1$ and consists of power amplifier voltage to current scale factor, amplifier current to motor torque scale factor, motor torque to mirror inertia angular acceleration scale factor, and dynamic integration of mirror inertia angular acceleration to mirror angle. In closed loop operation mirror angular position sensors close a servo loop around the mirror for angular position control. Operation 80 then proceeds to procedure 74 which uses a steering mirror optical gain matrix, as shown in FIG. 24. The output from operation 74 may be combined with $\delta\theta_{AS}$, which represents a dynamic change in angle of the AA optical reference source 12 from the initial angle. As shown in FIG. 3A, the operation 40 may also include procedure 75 which involves the sum of dynamic angle changes of the AA optical reference beam ($\delta\theta_{SBC}, \delta\theta_{BG}$, and $\delta\theta_{OG}$). $\delta\theta_{ABC}$ represents a dynamic change in angle of the autoalignment beam combiner 14 from initial angle. $\delta\theta_{BG}$ represents a dynamic change in angle of the gimbal base relative to the optical bench from initial angle $\delta\theta_{OG}$ represents a dynamic change in angle of the outer gimbal relative to the optical bench from initial angle. Gut ray angle $\theta_{GUT}$ may be a function of fast steering mirror 16's compensation angle, as shown in FIG. 17b. The gut ray angles may be derived from knowing mirror optical gain ($G_{OPM1}$) and the telescope magnification ($M_T$). Referring back to FIG. 15, operation 80 then proceeds to procedure 76 wherein an optical bench mirror to inner gimbal rotation matrix is used to describe the actual physical rotational angle changes of the AA optical reference beam from steering mirror 16 on optical bench 18 to the inner gimbal 20. As fast steering mirrors 16, 22 move to achieve gut ray 34 tilt based on the range input, the beams from the optical reference source and other system beams translate on secondary optical element 24 and on secondary translation sensors 30a, 30b, as shown in FIG. 18. $\delta\theta_{IG}$ may be an input into operation 40, wherein $\delta\theta_{IG}$ represents a dynamic change in angle of the inner gimbal relative to the optical bench from initial angle. These dynamic changes from initial conditions are disturbance in the optical path, changing the angles of the AA optical reference source at sensed at the AA angle and translation detectors. In procedure 78, a transform operation wherein transform describes the actual physical operation from mirror angles ($\alpha, \beta$) tilts to linear translation ($\delta y, \delta x$) on the secondary mirror is performed. In one embodiment, the transform from mirror angles to linear on the secondary mirror is a function of a lever arm distance (L1+L2) (see FIG. 18) from first fast steering mirror 16 to secondary optical element 24, lever arm distance (L2) from second fast steering mirror 22 to secondary optical element 24, and the corresponding fast steering mirror optical gain ($G_{OP}$) in the corresponding axes. In procedure 82, secondary translation detectors 30a, 30b output signals corresponding to the sensed beam translation $\delta x, \delta y$. $\delta\theta_{TD}$ may also be an input into procedure 82 40, wherein $\delta\theta_{TD}$ represents a dynamic change in position of the translation detectors 82 from initial position. Referring back to procedure 70, operation 80 proceeds to procedure 84 after the commands have been processed through the matrix of procedure 70. It is contemplated that procedures 84 and 72 may be performed simultaneously. In procedure 84, an optical bench mirror to inner gimbal rotation matrix is used to adjust the values to compensate for change of steering mirror 16 on optical bench 18 to inner gimbal 20. Operation 80 then proceeds to procedure 86 wherein a transform operation is performed to transform first steering mirror angles ($\alpha_1, \beta_1$) to second steering mirror angles ($\alpha_2, \beta_2$) with the condition that the motion on secondary optical element 24 is zero ($\delta y=0, \delta x=0$), as shown in FIG. 19. A transform may also be performed for the condition that the distances L1, L2 are equal (L1=L2) and the optical gains are also equal ($G_{OP\alpha1}=G_{OP\alpha2}=G_{OP\beta1}=G_{OP\beta1}$). First steering mirror angles $\alpha_1, \beta_1$ may be transformed to second steering mirror angles $\alpha_2, \beta_2$ with the condition of keeping the beams from the optical reference source centered on secondary optical element 24, as shown in FIG. 20a at the desired position. Operation 80 may then proceed to procedure 88 wherein the compensation values of mirror 22 ($\alpha_2, \beta_2$) are obtained. Procedure 88 involves an open loop or closed loop transform from steering mirror command voltage to steering mirror angle $\alpha2, \beta2$ and consists of power amplifier voltage to current scale factor, amplifier current to motor torque scale factor, motor torque to mirror inertia angular acceleration scale factor, and dynamic integration of mirror inertia angular acceleration to mirror angle. In closed loop operation mirror angular position sensors close a servo loop around the mirror for angular position control. Operation 80 then proceeds to procedure 90 which uses a mirror optical gain matrix, as shown in FIG. 24 to describe actual beam angle rotations due to mirror 22 rotation angles $\alpha2, \beta2$. The results from procedure 76 and procedure 90 may be added and operation 80 may proceed to procedure 92 wherein the effect of telescope magnification ($M_T$) on the AA optical reference beam angle is accounted for. Secondary mirrors 16, 22 may be tilted or moved according to angles $\alpha_1, \beta_1, \alpha_2, \beta_2$, respectively. Operation 80 may then proceed back to procedure 59 wherein the beams are sensed by angle sensors AA1, AA2, and AA3 to obtain outputs $\theta_{AA1}, \theta_{AA2}, \theta_{AA3}$, which are the inputs to operation 60.

In some embodiments, operation 79 of FIG. 5 may operate in a similar manner as operation 80, but the sightline inertial positioning errors may be used as inputs instead. Mirrors 16, 22 may be tilted to compensate for such sightline errors during performance of operation 79. The positioning of the LOS about the y or x axis may move the positioning of the energy beam on energy sensors AA1, AA2, AA3 as shown in FIGS. 6a-6c, in accordance with an embodiment. That is, FIG. 6a shows the positioning of the energy beam on primary optical element 26 such that the readings from sensors AA1, AA2, and AA3 are at a null. In one embodiment, the movement of the LOS about the y-axis moves the positioning of the energy beam laterally in the x direction on sensors AA1, AA2, and AA3, as shown in FIG. 6b. Similarly, in such embodiment, the movement of the LOS about the x-axis moves the positioning of the energy beam vertically in the y-direction on sensors AA1, AA2, and AA3, as shown in FIG. 6c.

Figure 20B:
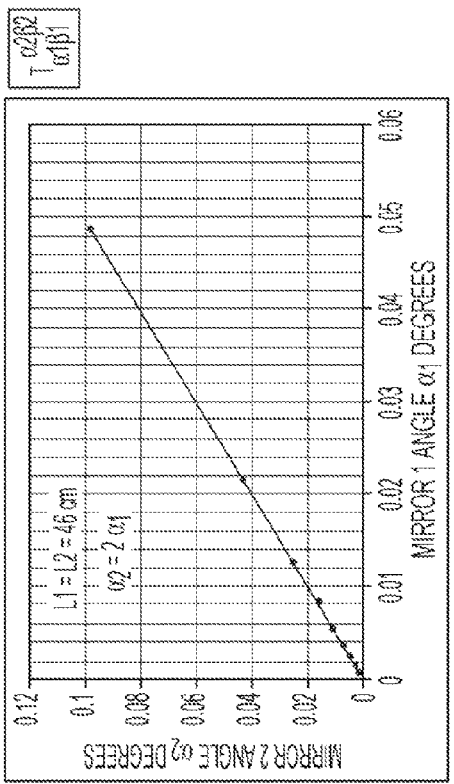
FIG. 20b is an exemplary plot of the first and second steering mirror angles as a function of range.
Figure 20C:
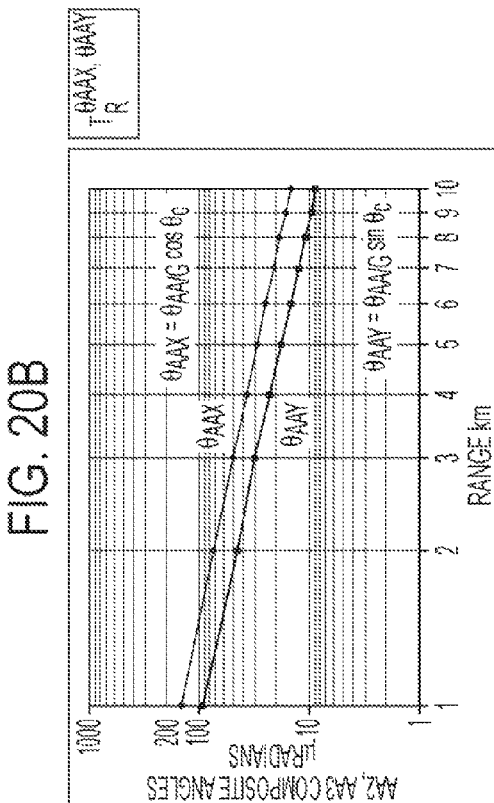
FIG. 20c is an exemplary plot of composite angles of two of the plurality of angle sensors as a function of range.
Figure 20D:
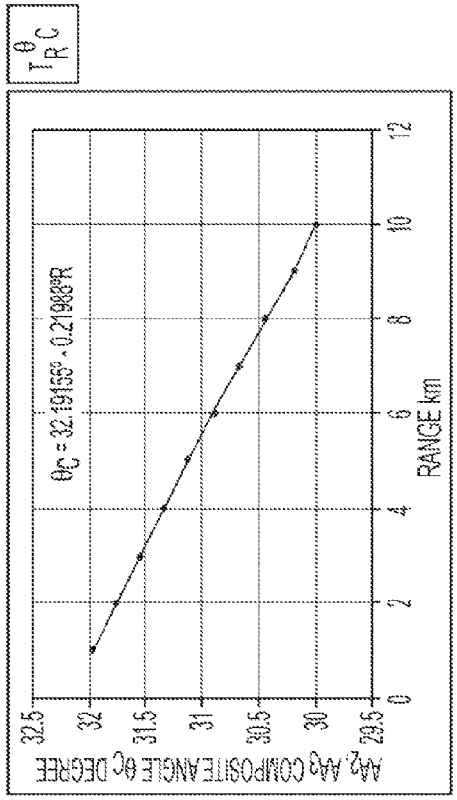
FIG. 20d is an exemplary plot of angles in radians for the two of the plurality of angle sensors as a function of range.

FIG. 20b shows a plot of mirror angles ($\alpha_1, \alpha_2$) as a function of range required for focus in accordance with an embodiment. FIG. 20c shows a plot of angle sensors AA2, AA3 composite angles relative to gut ray ($\theta_c$) as a function of range in accordance with an embodiment. In this embodiment, angle $\theta_c$ may be 30 degrees when the range is 10 km, but may vary as gut ray 34 is tilted. FIG. 20d shows a plot of the angles of the angle sensors relative to gut ray ($\theta_{AAX}, \theta_{AAY}$) as a function of range. As mentioned above, operation 79 shown in FIG. 5 may also be performed to tilt mirrors 16, 22, thus affecting the positioning of the energy beam on sensors AA1, AA2, and AA3. Operation 79 may be performed using sightline error commands ($\Delta\theta_{LOSX}, \Delta\theta_{LOSY}$) as inputs.

Figure 9:
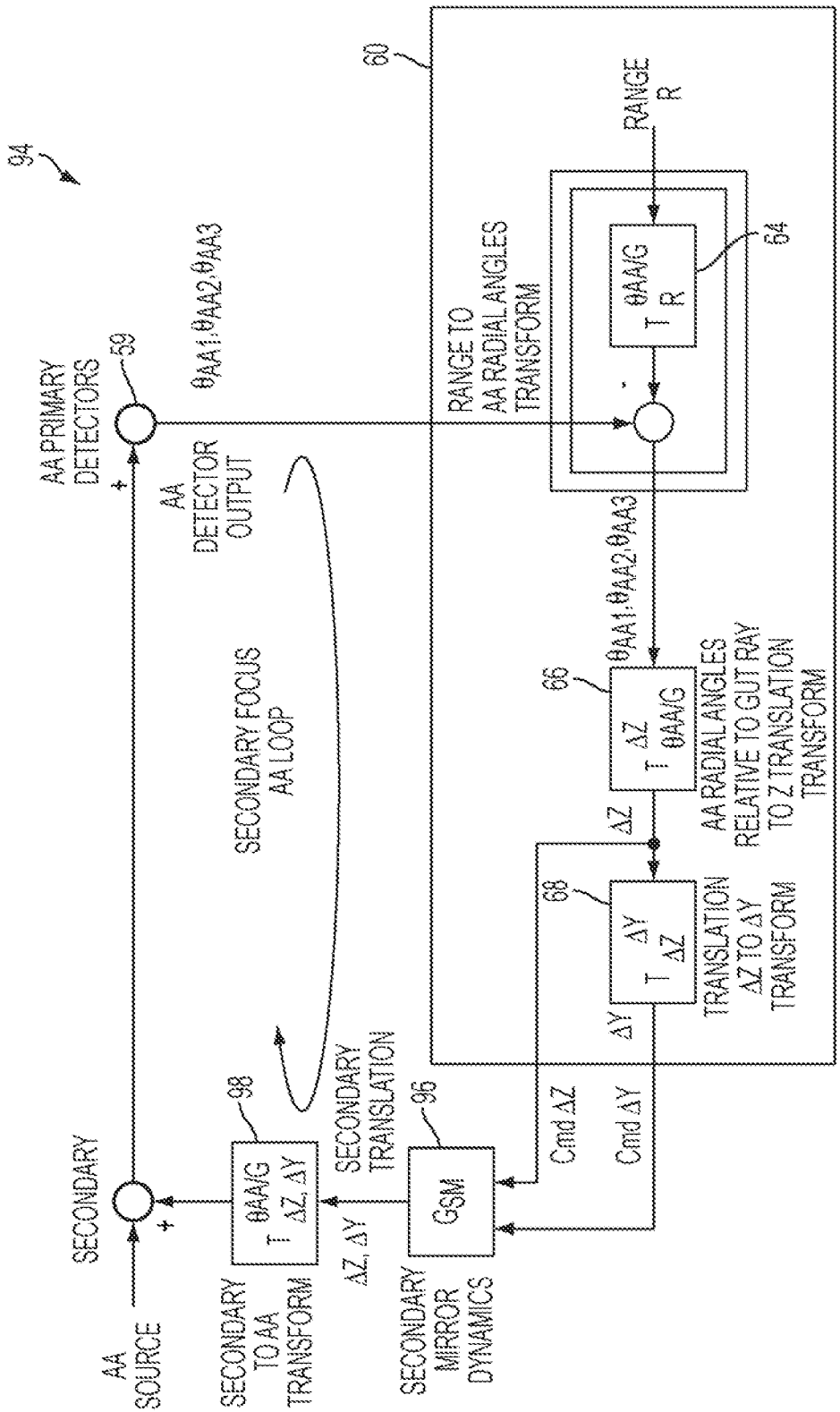
FIG. 9 illustrates an operation in an embodiment wherein the secondary optical element is translated for focus.
Figure 10:
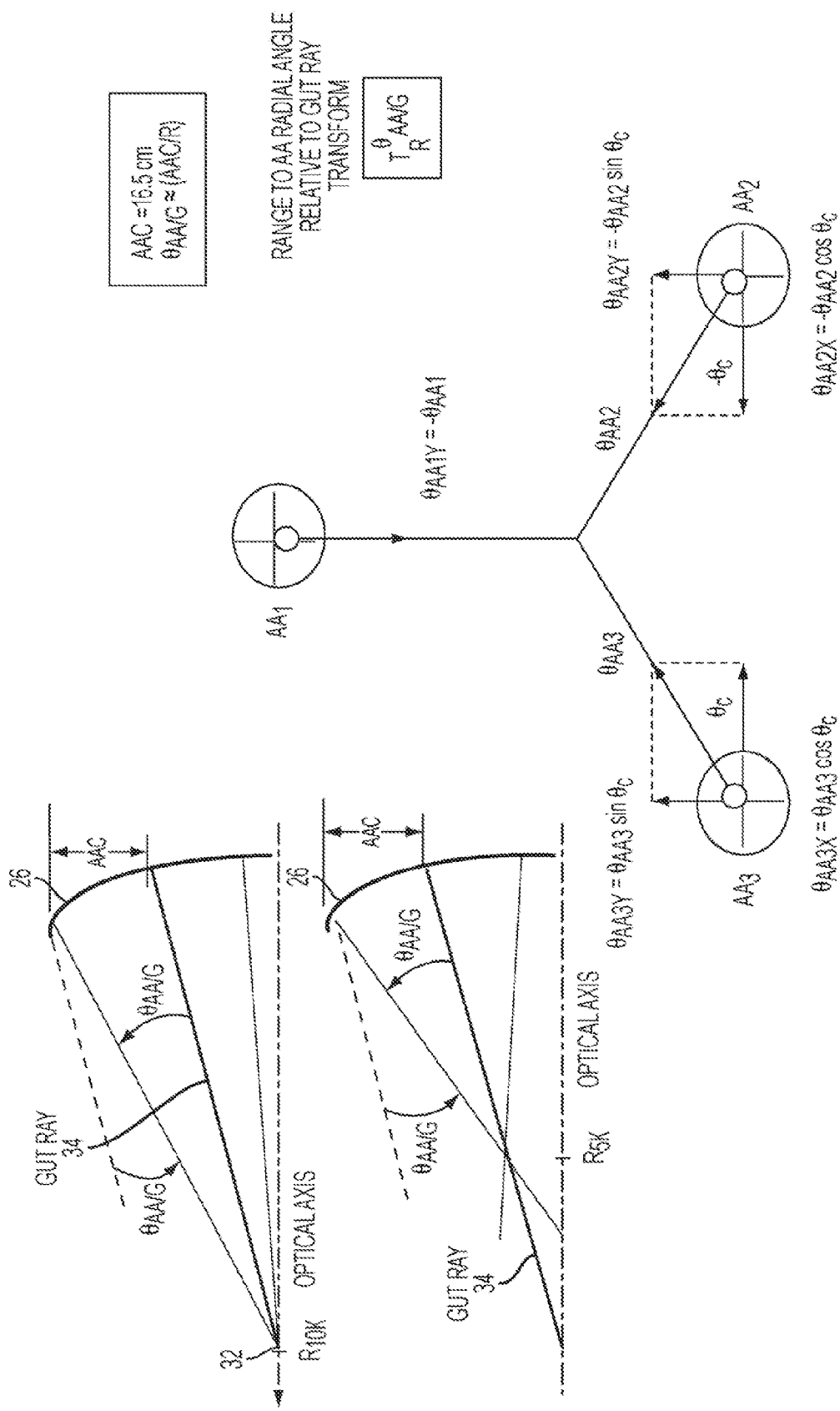
FIG. 10 illustrates exemplary effects of the translation of the secondary optical element.

FIG. 9 shows an operation 94 wherein secondary optical element 24 is translated for focus. That is, operation 94 involves the focus of the beam on target 32 by translating secondary optical element 24. As shown in FIGS. 8a-8b, the translation of secondary optical element 24 may move the focus of the beams. Linear 2-axis translation of secondary optical element 24 in the x and y axes may also affect the angular position on angle sensors AA1, AA2, and AA3 radially from the gut ray, as shown in FIG. 10.

Figures 11A, 11B:
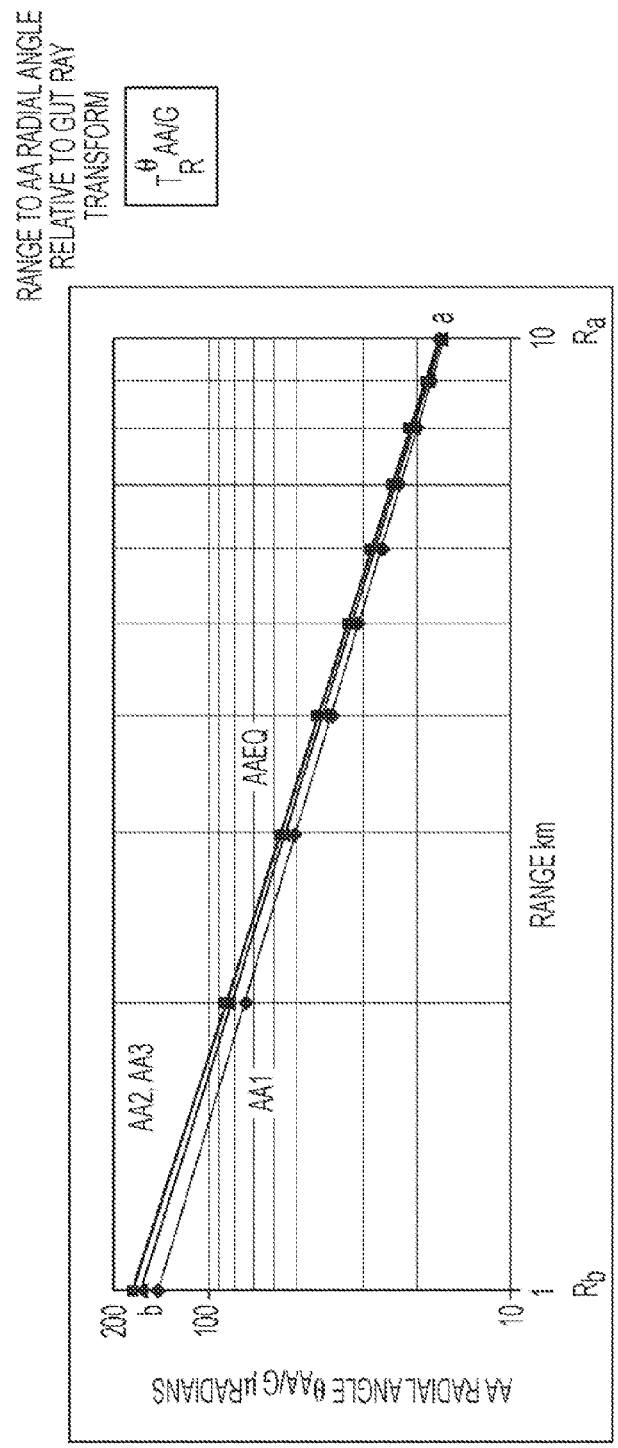
FIGS. 11a-11b illustrate exemplary equations for calculating the radial angles relative to the gut ray and a plot of the radial angles relative to the gut ray as a function of range, respectively.

Referring back to FIG. 9, operation 94 includes a portion of operation 60, and the range is an input to the portion of operation 60. In procedure 64, a transform operation is performed involving optical reference source radial angles ($\theta_{AA/G}$) relative to gut ray as a function of range (R). Values for $\theta_{AA/G}$ may be determined using HEXAGON analysis or geometric optics, as shown in FIG. 7b. The results of the HEXAGON analysis and geometric optics are similar. In one embodiment, the optical reference source radial angles relative to gut ray ($\theta_{AA/G}$) for each sensor AA1, AA2, AA3 may be calculated according to the equations shown in FIG. 11a. FIG. 11b illustrates a plot of the HEXAGON analysis values for the optical reference source angular motion relative to gut ray $\theta_{AA/G}$ as a function of range.

Figure 12A:
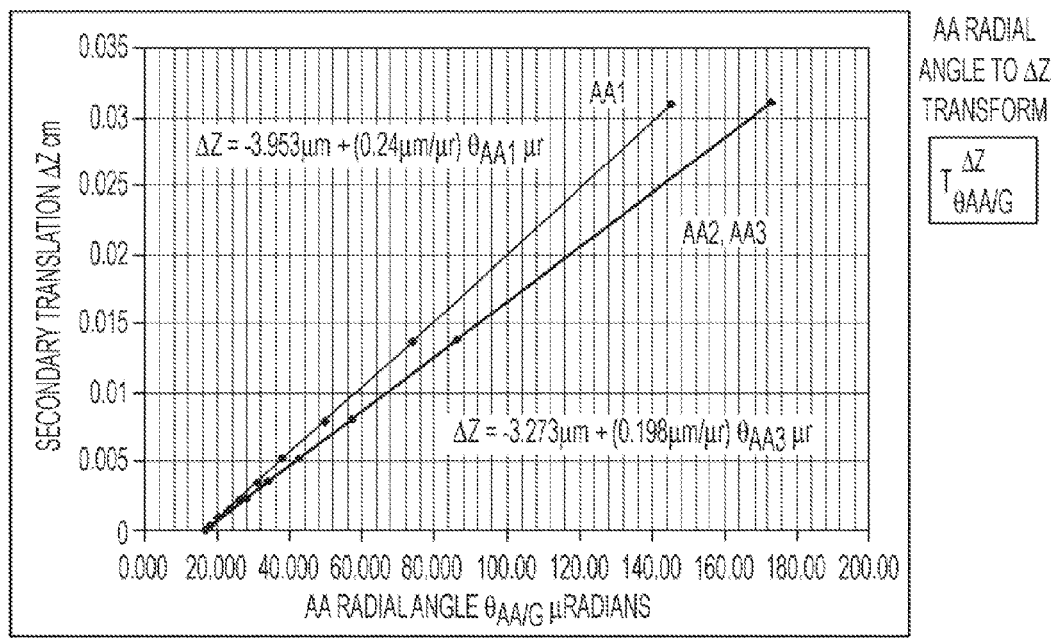
FIG. 12a is an exemplary plot of secondary translation in the Z direction as a function of radial angles relative to the gut ray.
Figure 12B:
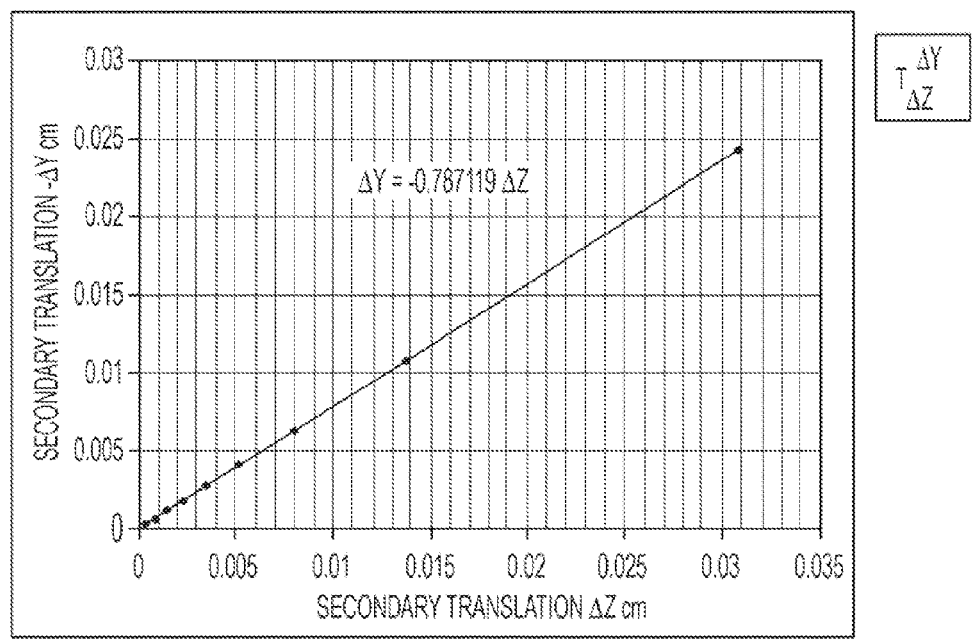
FIG. 12b is an exemplary plot of secondary translation in the Y direction as a function of secondary translation in the Z direction.
Figure 12C:
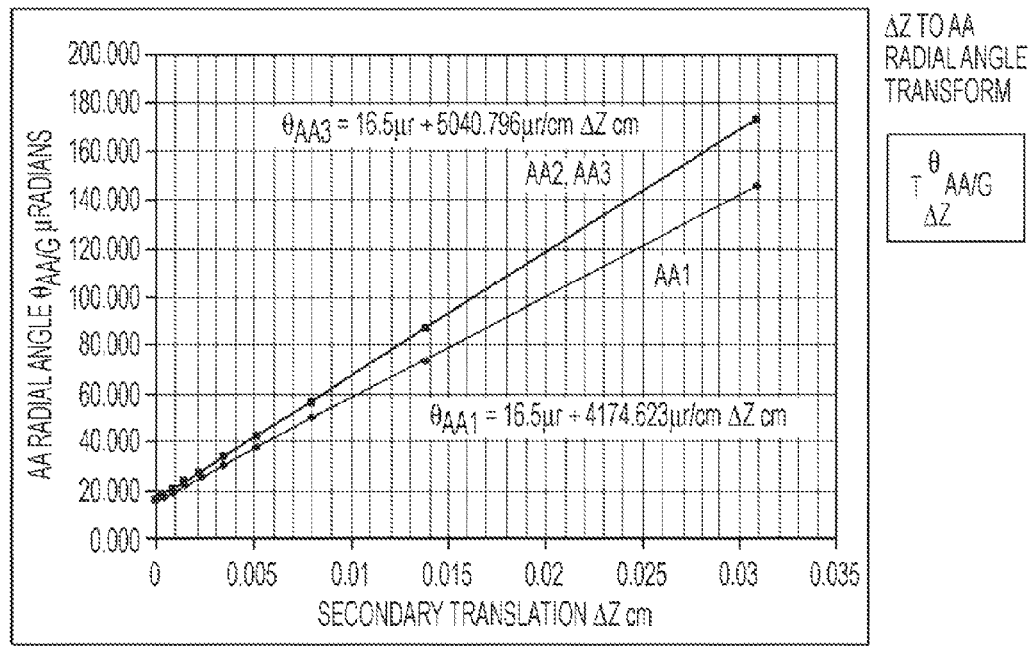
FIG. 12c is an exemplary plot of radial angles relative to the gut ray as a function of the secondary translation in the Z direction.
Figure 12D:
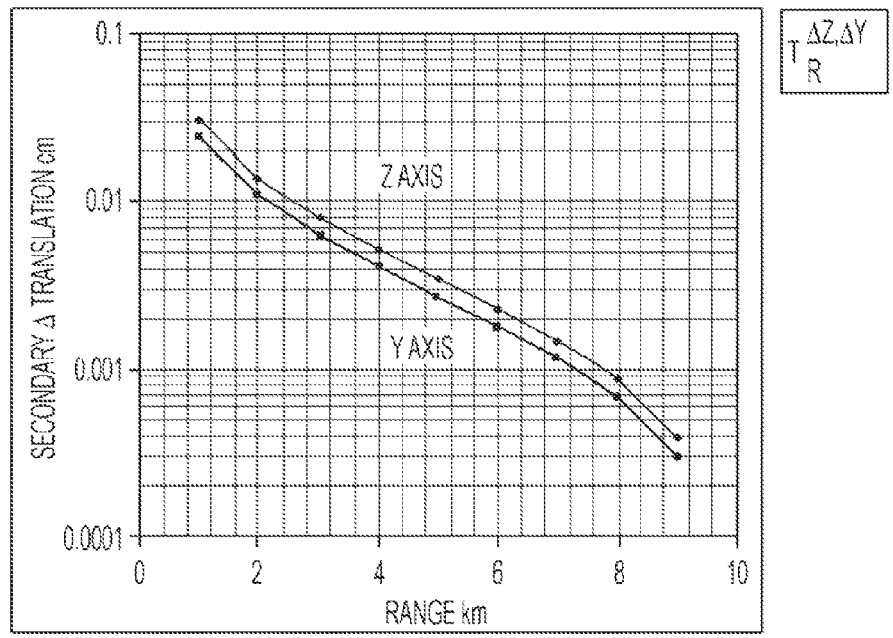
FIG. 12d is an exemplary plot of the secondary translation in the Z and Y directions as a function of range.

Operation 94 also includes procedure 59 wherein angle sensors AA1, AA2, AA3 detect the beams from the optical reference source and other systems. The output of sensors $\theta_{AA1}, \theta_{AA2}, \theta_{AA3}$ are inputs to operation 60. Operation 94 proceeds to procedure 66, which has a transform operation involving the transform of the optical reference radial angles relative to gut ray $\theta_{AA/G}$ to the Z-translation of secondary optical element 24. FIG. 12a is a plot of the HEXAGON analysis of the Z-axis translation of secondary optical element 24 as a function of the optical reference angles relative to gut ray $\theta_{AA/G}$. The operation 94 then proceeds to procedure 68 which has a transform operation involving a translation in the y-axis of secondary optical element 24 as a function of the translation in the z-axis. FIG. 12b illustrates a plot of HEXAGON analysis of the y-axis translation of secondary optical element 24 as a function of the z-axis translation of secondary optical element 24. The y-axis and z-axis translations are commands (cmd $\Delta Z$, cmd $\Delta Y$) that are outputted from operation 60. These commands relate to the movement of secondary optical element 24. Procedure 94 proceeds to procedure 96 wherein the $\Delta Y$, $\Delta Z$ are determined. Procedure 96 involves the open loop or closed loop transform from secondary mirror 24 command voltages to secondary mirror positions $\Delta Y, \Delta Z$ and consists of power amplifier voltage to current scale factor, amplifier current to actuator force scale factor, actuator force to secondary mirror mass linear acceleration scale factor, and dynamic integration of mirror mass linear acceleration to secondary mirror position. In closed loop operation secondary mirror linear position sensors close a servo loop around the secondary mirror for linear position control. Operation 94 then proceeds to procedure 98 wherein secondary mirror translations $\Delta Y$, $\Delta Z$ are physically transformed into resulting optical reference radial angles on the AA angle sensors relative to gut ray $\theta_{AA/G}$. FIG. 12c shows a plot of HEXAGON analysis of optical reference radial angles $\theta_{AA/G}$ as a function of z-axis translation of secondary optical element 24 for angle sensors AA1, AA2, AA3. Resulting optical reference radial angles $\theta_{AA/G}$ may be compared to desired optical reference radial angles obtained in procedure 64. FIG. 12d shows a plot of the HEXAGON analysis of the z-axis and y-axis translation of secondary optical element 24 as a function of range for focus. Procedure 94 may then proceed to procedure 59 where angle sensors AA1, AA2, AA3 sense the positioning of the beams from optical reference source 12.

FIG. 3a shows composite auto-alignment control operation 40. In one embodiment, composite auto-alignment control operation 40 includes the combination of operations 60 (see FIG. 3b), 79 (see FIG. 5), and 94 (see FIG. 9). Composite closed loop auto-alignment control operation 40 enables the auto-alignment of off-axis telescope system 10 such that the energy beam from optical reference source 12 is steered and focused in the desired pointing direction onto target 32. Composite closed loop auto-alignment control operation 40 may continuously, automatically, and simultaneously auto-align telescope system 10 to achieve angular auto-alignment of the energy beams from optical reference source 12 and other systems, LOS inertial stabilization of the energy beams, translation control of secondary optical element 24 to focus at the desired range, tilt control of gut ray 34 to focus at the desired range, and linear centering of the energy beams on secondary optical element 24.

As shown in FIG. 3a, inputs to the operation 40 are range and LOS sightline error commands ($\Delta\theta_{LOSX}, \Delta\theta_{LOSY}$). The outputs from angle sensors $\theta_{AA1}, \theta_{AA2}, \theta_{AA3}$ may provide continuous inputs or feedback into operation 40. Thus, outputs from the angle sensors $\theta_{AA1}, \theta_{AA2}, \theta_{AA3}$ may be used to determine whether operation 40 has achieved its goal of auto-aligning the energy beams of off-axis telescope system 10. That is, outputs from the angle sensors $\theta_{AA1}, \theta_{AA2}, \theta_{AA3}$ may be used to determine whether solutions $(\alpha, \beta, \gamma)A_1$, $(\alpha, \beta, \gamma)A_2$, $(\alpha, \beta, \gamma)A_3$ (see FIG. 2) have been realized.

Outputs from control logic operation 60 (cmd $\Delta Z$, cmd $\Delta Y$) relate to the movement of secondary optical element 24 to achieve focus. The other outputs from control logic operation 60 ($\theta_{AAX}, \theta_{AAY}$) relate to the movement of steering mirrors 16, 22 to achieve the desired tilt of gut ray 34. Outputs (cmd $\Delta Z$, cmd $\Delta Y$, $\theta_{AAX}, \theta_{AAY}$) from control logic operation 60 are modified in composite auto-alignment control operation 40 to account for optical bench 18 to gimbal 20 change, optical gains, and other factors. Angle sensors $\theta_{AA1}, \theta_{AA2}, \theta_{AA3}$ may continuously provide feedback in the form of output signals to operation 40 to determine whether the movement of steering mirrors 16, 22 and secondary optical element 24 are sufficient to auto-align the energy beams.

It is contemplated that any of the procedures in operation 40 may be performed simultaneously with other procedures. In one embodiment, operations 94 and 80 may be performed simultaneously. In one embodiment, operation 40 is performed until the beams achieve positional settings $(\alpha,\beta,\gamma)A_1$, $(\alpha,\beta,\gamma)A_2$, $(\alpha,\beta,\gamma)A_3$ and are aligned with sensors AA1, AA2, AA3 such that the output of sensors AA1, AA2, AA3 are at a null when sensors AA1, AA2, and AA3 are sensing the beams. In one embodiment, the beam has achieved its desired position when the residual from sensors AA1, AA2, AA3, which is the difference between the desired positional settings and the actual position of the beams on the sensors, is zero.

FIG. 25 illustrates controller 100 in accordance with an embodiment. Controller 100 may be used to perform operation 40 or any of the portions of operation 40 described above. In the illustrated embodiment, controller 100 includes memory 102 and processor 104. Memory 102 may be used to store HEXAGON analysis data or other data, such as, just for example, the ranges of target 32, sightline errors, and readings from angle sensors AA1, AA2, and AA3. Any one or more of the inputs may be received by input module 106. In one embodiment, the angle sensor readings may be continuously or intermittently received by controller 100 during the auto-alignment process. Controller 100 may also include output module 108 configured to output tilt commands $(\theta_{AAX}, \theta_{AAY})$ for mirrors 16, 22 and translating commands (cmd $\Delta Z$, cmd $\Delta Y$) for secondary optical element 24. It is contemplated that output module 108 may be operatively connected to processor 104 such that processor 104 may process data stored in memory 102 and other data to determine the tilt commands and the translating commands. Output module 108 may output one or both of the tilt commands and the translating commands to any of the other modules of controller 100 or to other devices. Tilt commands may be used by tilt module 110 for tilting steering mirrors 16, 22 in response to the range input and readings from angle sensors AA1, AA2, and AA3. Translating commands may be used by translation module 114 for translating secondary optical element 24 in response to the range input and readings from angle sensors AA1, AA2, and AA3. Controller 100 may also include inertial stabilization module 112 for inertially stabilizing the LOS or gut ray 34 of telescope system 10 in response to the sightline error inputs. Controller 100 may further include centering module 116 for centering the energy beam on secondary optical element 24. It is contemplated that any combination of the above-mentioned modules may be included or may be operatively connected to one another.

Although auto-alignment controller 100 described above is described with respect to an off-axis telescope used with a high energy laser, it is also contemplated that controller 100 may be used in other systems. For example, controller 100 may be used with passive systems, such as imaging systems. It is also contemplated that controller 100 may be used in any variety of tactical military systems or other applications.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. An off-axis telescope comprising: a primary optical element configured to reflect an energy beam from an optical reference source, the energy beam being emitted from the optical reference source along an optical path; a plurality of angle sensors arranged on a periphery of the primary optical element so as to determine angular motion of the energy beam from the optical reference source reflected off the primary optical element, wherein the angle sensors are operable to be biased to angular position settings associated with a desired pointing direction of the energy beam; a secondary optical element arranged in the optical path and configured to be translated along three orthogonal axes; a plurality of steering mirrors arranged between the optical reference source and the secondary optical element configured to be tilted in response to a control signal; a controller that auto-aligns the telescope by at least translating the secondary optical element and tilting the steering mirrors via the control signal using at least inputs from the plurality of angle sensors.

2. The telescope of claim 1, further comprising secondary translation detectors associated with the secondary optical element and configured to determine linear motion of the energy beam from the optical reference source on the secondary optical element.

3. The telescope of claim 1, wherein the plurality of angle sensors are arranged at 120 degrees apart along the periphery of the primary optical element so as to detect an angular positioning of the energy beam from the optical reference source with respect to the primary optical element.

4. The telescope of claim 1, wherein the controller comprises a closed loop control system that auto-aligns the energy beam from the optical reference source to the plurality of angle sensors.

5. The telescope of claim 1, wherein the controller translates the secondary optical element and tilts the steering mirrors simultaneously.

6. The telescope of claim 1, wherein the controller aligns the optical reference source energy beam with the angle sensors of the primary optical element.

7. The telescope of claim 1, wherein the controller centers the optical reference source energy beam at a desired position on the secondary optical element.

8. The telescope of claim 1, wherein the controller inertially stabilizes a line of sight of the telescope in response to a sightline error input received from an inertial measurement unit of an inertial stabilization subsystem.

9. The telescope of claim 1, wherein the controller tilts a gut ray of the energy beam so as to focus the energy beam as a function of a range input.

10. The telescope of claim 9, wherein the energy beam is tilted by tilting the steering mirrors.

11. The telescope of claim 1, wherein the controller translates the secondary optical element so as to focus the energy beam as a function of a range input.

12. A method of auto-aligning an off-axis telescope comprising a primary optical element, a secondary optical element, and a plurality of steering mirrors, the secondary optical element being configured to be translated in three orthogonal axes, and the steering mirrors being configured to be tilted about two perpendicular axes, the method comprising: obtaining a range of a target; determining a desired pointing direction of an energy beam from an optical reference source relative to an axis of revolution of the telescope based at least on the range; biasing a plurality of angle sensors configured to determine angular motion of the energy beam to angular positions associated with the desired pointing direction of the energy beam based on the range of the target;

steering and focusing the energy beam along the desired pointing direction onto the target by at least translating the secondary optical element and tilting the steering mirrors.

13. The method of claim 12, wherein said steering and focusing the energy beam comprises providing a closed loop control of the translated secondary optical element and the tilted steering mirrors.

14. The method of claim 12, wherein the plurality of angle sensors are arranged at 120 degrees apart along a periphery of the primary optical element so as to detect a positioning of the energy beam with respect to the primary optical element angle sensors.

15. The method of claim 13, wherein said providing the closed loop control comprises processing an input relating to a current pointing direction of the optical reference source relative to an axis of revolution of the telescope, the current pointing direction determined by the plurality of angle sensors.

16. The method of claim 13, further comprising providing simultaneous closed loop control of the secondary optical element and the steering mirrors.

17. The method of claim 13, further comprising aligning the energy beam with the primary optical element.

18. The method of claim 13, further comprising centering the energy beam on the secondary optical element at a desired position.

19. The method of claim 13, further comprising inertially stabilizing a line-of-sight of the telescope by a sight line error input provided by an inertial measurement unit of an inertial stabilization subsystem.

20. The method of claim 13, further comprising tilting a gut ray of the energy beam for focus in response to the range.

21. The method of claim 20, wherein the tilting of the gut ray comprises tilting the steering mirrors.

22. The method of claim 13, further comprising controlling translation of the secondary optical element for focus based on the range.

23. An article of manufacture comprising a tangible computer readable medium having computer-executable instructions thereon for execution by a processor, which, when executed by the processor, carry out the functions of auto-aligning an off-axis telescope having a primary optical element, a second optical element, a plurality of steering mirrors, said functions comprising: obtaining a range of a target; determining a desired pointing direction of an energy beam from an optical reference source relative to an axis of revolution of the telescope based at least on the range; biasing a plurality of angle sensors configured to determine angular motion of the energy beam to angular positions associated with the desired pointing direction of the energy beam based on the range of the target; steering and focusing the energy beam along the desired pointing direction onto the target by at least translating the secondary optical element and tilting the steering mirrors.

* * * * *